(12) United States Patent
Ma et al.

(10) Patent No.: US 12,238,297 B2
(45) Date of Patent: Feb. 25, 2025

(54) METHOD FOR CONSTRUCTING MPM LIST, METHOD FOR OBTAINING INTRA PREDICTION MODE OF CHROMA BLOCK, AND APPARATUS

(71) Applicant: HUAWEI TECHNOLOGIES CO., LTD., Shenzhen (CN)

(72) Inventors: Xiang Ma, Moscow (RU); Haitao Yang, Shenzhen (CN); Yin Zhao, Hangzhou (CN); Lian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 17/541,467

(22) Filed: Dec. 3, 2021

(65) Prior Publication Data

US 2022/0094947 A1 Mar. 24, 2022

Related U.S. Application Data

(63) Continuation of application No. PCT/CN2020/094387, filed on Jun. 4, 2020.

(30) Foreign Application Priority Data

Jun. 5, 2019 (CN) .......................... 201910486183.5

(51) Int. Cl.
*H04N 7/12* (2006.01)
*H04N 19/103* (2014.01)
(Continued)

(52) U.S. Cl.
CPC ......... *H04N 19/159* (2014.11); *H04N 19/103* (2014.11); *H04N 19/176* (2014.11); *H04N 19/186* (2014.11); *H04N 19/70* (2014.11)

(58) Field of Classification Search
CPC .. H04N 19/159; H04N 19/103; H04N 19/176; H04N 19/186; H04N 19/70;
(Continued)

(56) References Cited

U.S. PATENT DOCUMENTS 9,497,462 B2 * 11/2016 Oh ...................... H04N 19/105
2017/0214912 A1 7/2017 Cote et al.
(Continued)

FOREIGN PATENT DOCUMENTS

CN 102857764 A 1/2013
CN 109314790 A 2/2019
(Continued)

OTHER PUBLICATIONS

Document: JVET-N1001-v7, Benjamin Bross et al, Versatile Video Coding (Draft 5), Joint Video Experts Team (JVET) of ITU-T SG 16 WP 3 and ISO/IEC JTC 1/SC 29/WG11, 14th Meeting: Geneva, CH, Mar. 19-27, 2019, 384 pages, XP30205196.
(Continued)

*Primary Examiner* — Gims S Philippe
(74) *Attorney, Agent, or Firm* — Rimon PC

(57) ABSTRACT

This application discloses a method for constructing an MPM list, a method for obtaining an intra prediction mode of a chroma block, and an apparatus. In a specific implementation, a MIP mode is used for a current block, and the method for constructing an MPM list includes: obtaining intra prediction mode information of a neighboring block; determining, based on the intra prediction mode information of the neighboring block, whether an intra prediction mode of the neighboring block is the MIP mode; and skipping using the intra prediction mode of the neighboring block for MPM list construction of the current block if the intra prediction mode of the neighboring block is not the MIP mode; or using the intra prediction mode of the neighboring (Continued)

block for MPM list construction of the current block if the intra prediction mode of the neighboring block is the MIP mode.

14 Claims, 10 Drawing Sheets

(51) Int. Cl.
*H04N 19/159* (2014.01)
*H04N 19/176* (2014.01)
*H04N 19/186* (2014.01)
*H04N 19/70* (2014.01)

(58) Field of Classification Search
CPC .... H04N 19/11; H04N 19/593; H04N 19/147; H04N 19/44; H04N 19/52; H04N 19/625; H04N 19/96; H04N 19/105; H04N 19/61
USPC .................................................. 375/240.12
See application file for complete search history.

(56) References Cited

U.S. PATENT DOCUMENTS

| | | | |
|---|---|---|---|
| 2020/0359033 A1 | 11/2020 | Ramasubramanian et al. | |
| 2021/0297661 A1 | 9/2021 | Deng et al. | |
| 2021/0297672 A1* | 9/2021 | Deng | H04N 19/159 |
| 2021/0344915 A1* | 11/2021 | Wang | H04N 19/176 |
| 2021/0385459 A1* | 12/2021 | Zhu | H04N 19/176 |
| 2022/0030228 A1* | 1/2022 | Ma | H04N 19/11 |
| 2022/0078450 A1* | 3/2022 | Salehifar | H04N 19/593 |

FOREIGN PATENT DOCUMENTS

| | | |
|---|---|---|
| CN | 109792516 A | 5/2019 |
| KR | 20130099852 A | 9/2013 |
| WO | 2019098464 A1 | 5/2019 |
| WO | 2020207498 A1 | 10/2020 |
| WO | 2020227393 A1 | 11/2020 |

OTHER PUBLICATIONS

Document: JVET-N0217, Jonathan Pfaff et al, CE3: Affine linear weighted intra prediction (CE3-4.1, CE3-4.2), Joint Video Experts Team (JVET) of ITU-T SG 16 WP 3 and ISO/IEC JTC 1/SC 29/WG 11, 14th Meeting: Geneva, CH, Mar. 19-27, 2019, total 17 pages.
ITU-T H.261 (Mar. 1993), Line Transmission of Non-Telephone Signals, Video Codec for Audiovisual Services at px64 kbits, total 29 pages.
Document: JVET-O0255-v1, Kai Zhang et al, Non-CE3: Fixed MPMs for MIP, Joint Video Experts Team (JVET) of ITU-T SG 16 WP 3 and ISO/IEC JTC 1/SC 29/WG 11, 15th Meeting: Gothenburg, SE, Jul. 3-12, 2019, total 8 pages.
ITU-T H.263(Jan. 2005), Series H: Audiovisual and Multimedia Systems, Infrastructure of audiovisual services—Coding of moving video, Video coding for low bit rate communication, total 226 pages.
Document: JVET-O 0469_v4, Dongcheol Kim et al, Non-CE3: Simplification of Mip Mpm Derivation, Joint Video Experts Team (JVET) of ITU-T SG 16 WP 3 and ISO/IEC JTC 1/SC 29/WG 11, 15th Meeting: Gothenburg, SE, Jul. 3-12, 2019, total 4 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.
Tang Jin et al., "Fast Intra Coding Algorithm for HEVC Based on Texture Property", Software Technique Algorithm, Jul. 15, 2018, with an English abstract; 6 total pages.

* cited by examiner

METHOD FOR CONSTRUCTING MPM LIST, METHOD FOR OBTAINING INTRA PREDICTION MODE OF CHROMA BLOCK, AND APPARATUS

CROSS-REFERENCE TO RELATED APPLICATIONS

This application is a continuation of International Application No. PCT/CN2020/094387, filed on Jun. 4, 2020, which claims priority to Chinese Patent Application No.201910486183.5, filed on Jun. 5, 2019. The disclosures of the aforementioned applications are hereby incorporated by reference in their entireties.

TECHNICAL FIELD

This application relates to the video coding field, and in particular, to a method for constructing a most probable mode (MPM) list, a method for obtaining an intra prediction mode of a chroma block, and an apparatus.

BACKGROUND

Intra prediction refers to predicting a current block by using a reconstructed pixel in a picture in which the current block is located. Usually, a predicted value of a pixel of the current block is derived by using a pixel of a reconstructed neighboring block around the current block. The intra prediction is to map a reference pixel to each pixel location in the current block in a specific direction, to obtain a predicted value of a pixel at a corresponding location. Therefore, to cover various different texture or structure characteristics, there are a plurality of mapping directions or mapping manners. Usually, the mapping direction or the mapping manner is referred to as an intra prediction mode. A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development. In addition, at the 14th JVET meeting, a matrix-based intra prediction (MIP) mode is proposed in the proposal JVET-N0217. Intra prediction is performed mainly by using a top edge sample and a left edge sample of the current block.

The intra prediction relates to a most probable mode (MPM) list, which may include a plurality of (for example, three or five) intra prediction modes that are most probably to be used for the current block. The MPM list may be applied to MIP. To be specific, the MPM list is constructed based on an intra prediction mode of a neighboring block.

However, in an existing intra prediction method, conversion needs to be performed between the MIP and another intra prediction mode based on a correspondence between the MIP and the other intra prediction mode to construct an MPM list. This results in high complexity.

SUMMARY

Embodiments of this application provide a method for constructing an MPM list, a method for obtaining an intra prediction mode of a chroma block, and an apparatus, to reduce complexity of MPM list construction.

According to a first aspect, an embodiment of this application provides a method for constructing an MPM list, where a MIP mode is used for a current block, and the method includes:

obtaining intra prediction mode information of a neighboring block, where the neighboring block includes an above neighboring block and/or a left neighboring block of the current block; determining, based on the intra prediction mode information of the neighboring block, whether an intra prediction mode of the neighboring block is the MIP mode; and skipping using the intra prediction mode of the neighboring block for MPM list construction of the current block if the intra prediction mode of the neighboring block is not the MIP mode; or using the intra prediction mode of the neighboring block for MPM list construction of the current block if the intra prediction mode of the neighboring block is the MIP mode. The MIP mode is a newly added intra prediction technology in VVC, and intra prediction is performed mainly by using a top edge sample and a left edge sample of the current block. To predict a sample of a rectangular block with a width W and a height H, a column of H reconstructed neighboring samples on the left of the rectangular block and a row of W reconstructed neighboring samples above the rectangular block are used as an input in the MIP mode. If the reconstructed neighboring samples are unavailable, a sample is generated as in conventional intra prediction. A prediction signal is generated based on the following three steps: averaging, matrix vector multiplication, and linear interpolation.

In implementation of this embodiment, when the MIP mode is used for the current block, the intra prediction mode of the neighboring block is not used for the MPM list construction of the current block if the intra prediction mode of the neighboring block is not the MIP mode, so that complexity of the MPM list construction can be reduced.

In a possible implementation, the skipping using the intra prediction mode of the neighboring block for MPM list construction of the current block includes: setting the intra prediction mode of the neighboring block to unavailable.

In a possible implementation, the method further includes: setting a value of candMipModeX to −1, to indicate that the intra prediction mode of the neighboring block is not used for the MPM list construction of the current block.

In a possible implementation, the method further includes: using a default mode for the MPM list construction of the current block if the intra prediction mode of the neighboring block is not the MIP mode.

In a possible implementation, the using the intra prediction mode of the neighboring block for MPM list construction of the current block if the intra prediction mode of the neighboring block is the MIP mode includes: if the intra prediction mode of the neighboring block is the MIP mode, determining whether size indices of the current block and the neighboring block are the same; and skipping using the intra prediction mode of the neighboring block for the MPM list construction of the current block if the size indices of the current block and the neighboring block are different; or using the intra prediction mode of the neighboring block for the MPM list construction of the current block if the size indices of the current block and the neighboring block are the same.

In a possible implementation, the method further includes: obtaining the intra prediction mode of the neighboring block based on the intra prediction mode information of the neighboring block.

In a possible implementation, the determining, based on the intra prediction mode information of the neighboring block, whether an intra prediction mode of the neighboring block is the MIP mode includes: determining, based on a flag MIP_FLAG, whether the intra prediction mode of the neighboring block is the MIP mode, where the intra prediction mode information of the neighboring block includes the MIP_FLAG.

According to a second aspect, an embodiment of this application provides a method for constructing an MPM list, where a MIP mode is not used for a current block, and the method includes:

obtaining intra prediction mode information of a neighboring block, where the neighboring block includes an above neighboring block and/or a left neighboring block of the current block; determining, based on the intra prediction mode information of the neighboring block, whether an intra prediction mode of the neighboring block is the MIP mode; and skipping using the intra prediction mode of the neighboring block for MPM list construction of the current block if the intra prediction mode of the neighboring block is the MIP mode; or using the intra prediction mode of the neighboring block for MPM list construction of the current block if the intra prediction mode of the neighboring block is not the MIP mode.

In implementation of this embodiment, when the MIP mode is not used for the current block, the intra prediction mode of the neighboring block is not used for the MPM list construction of the current block if the intra prediction mode of the neighboring block is the MIP mode, so that complexity of the MPM list construction can be reduced.

In a possible implementation, the skipping using the intra prediction mode of the neighboring block for MPM list construction of the current block includes: setting the intra prediction mode of the neighboring block to unavailable.

In a possible implementation, the method further includes: setting a value of candIntraPredModeX to −1, to indicate that the intra prediction mode of the neighboring block is not used for the MPM list construction of the current block.

In a possible implementation, the method further includes: using a default mode for the MPM list construction of the current block if the intra prediction mode of the neighboring block is the MIP mode.

In a possible implementation, the method further includes: obtaining the intra prediction mode of the neighboring block based on the intra prediction mode information of the neighboring block.

In a possible implementation, the determining, based on the intra prediction mode information of the neighboring block, whether an intra prediction mode of the neighboring block is the MIP mode includes: determining, based on a flag MIP_FLAG, whether the intra prediction mode of the neighboring block is the MIP mode, where the intra prediction mode information of the neighboring block includes the MIP_FLAG.

According to a third aspect, an embodiment of this application provides a method for obtaining an intra prediction mode of a chroma block, where the method includes:

obtaining an intra prediction mode of a luma block, where the luma block is a luma block corresponding to a current chroma block; determining whether the intra prediction mode of the luma block is a MIP mode; and using the intra prediction mode of the luma block as an intra prediction mode of the current chroma block if the intra prediction mode of the luma block is not the MIP mode; or using a default mode as an intra prediction mode of the chroma block if the intra prediction mode of the luma block is the MIP mode.

For the current chroma block, an intra prediction mode of a luma block covering a center location of the current chroma block is directly inherited. To be specific, an intra prediction mode that is the same as that for a luma component is selected for a chroma component. This is an intra prediction mode obtaining method used when a chroma derived mode (DM) is used for a chroma block. In this application, based on the DM mode, in a case in which the MIP mode is added for the luma block, the intra prediction mode of the luma block is used as the intra prediction mode of the current chroma block if the intra prediction mode of the luma block is not the MIP mode, or the default mode is used as the intra prediction mode of the current chroma block if the intra prediction mode of the luma block is the MIP mode, so that complexity of obtaining the intra prediction mode of the chroma block can be reduced.

In a possible implementation, the default mode includes a planar mode or a DC mode.

According to a fourth aspect, an embodiment of this application provides an intra prediction apparatus, where a MIP mode is used for a current block, and the apparatus includes:

an obtaining module, configured to obtain intra prediction mode information of a neighboring block, where the neighboring block includes an above neighboring block and/or a left neighboring block of the current block; a determining module, configured to determine, based on the intra prediction mode information of the neighboring block, whether an intra prediction mode of the neighboring block is the MIP mode; and a processing module, configured not to use the intra prediction mode of the neighboring block for MPM list construction of the current block if the intra prediction mode of the neighboring block is not the MIP mode; or to use the intra prediction mode of the neighboring block for MPM list construction of the current block if the intra prediction mode of the neighboring block is the MIP mode.

In a possible implementation, the processing module is specifically configured to set the intra prediction mode of the neighboring block to unavailable.

In a possible implementation, the processing module is further configured to set a value of candMipModeX to −1, to indicate that the intra prediction mode of the neighboring block is not used for the MPM list construction of the current block.

In a possible implementation, the processing module is further configured to use a default mode for the MPM list construction of the current block if the intra prediction mode of the neighboring block is not the MIP mode.

In a possible implementation, the processing module is specifically configured to: if the intra prediction mode of the neighboring block is the MIP mode, determine whether size indices of the current block and the neighboring block are the same; and not use the intra prediction mode of the neighboring block for the MPM list construction of the current block if the size indices of the current block and the neighboring block are different; or use the intra prediction mode of the neighboring block for the MPM list construction of the current block if the size indices of the current block and the neighboring block are the same.

In a possible implementation, the obtaining module is further configured to obtain the intra prediction mode of the neighboring block based on the intra prediction mode information of the neighboring block.

In a possible implementation, the determining module is specifically configured to determine, based on a flag MIP_FLAG, whether the intra prediction mode of the neighboring block is the MIP mode, where the intra prediction mode information of the neighboring block includes the MIP_FLAG.

According to a fifth aspect, an embodiment of this application provides an intra prediction apparatus, where a MIP mode is not used for a current block, and the apparatus includes:

an obtaining module, configured to obtain intra prediction mode information of a neighboring block, where the neighboring block includes an above neighboring block and/or a left neighboring block of the current block; a determining module, configured to determine, based on the intra prediction mode information of the neighboring block, whether an intra prediction mode of the neighboring block is the MIP mode; and a processing module, configured not to use the intra prediction mode of the neighboring block for MPM list construction of the current block if the intra prediction mode of the neighboring block is the MIP mode; or to use the intra prediction mode of the neighboring block for MPM list construction of the current block if the intra prediction mode of the neighboring block is not the MIP mode.

In a possible implementation, the processing module is specifically configured to set the intra prediction mode of the neighboring block to unavailable.

In a possible implementation, the processing module is further configured to set a value of candIntraPredModeX to −1, to indicate that the intra prediction mode of the neighboring block is not used for the MPM list construction of the current block.

In a possible implementation, the processing module is further configured to use a default mode for the MPM list construction of the current block if the intra prediction mode of the neighboring block is the MIP mode.

In a possible implementation, the obtaining module is further configured to obtain the intra prediction mode of the neighboring block based on the intra prediction mode information of the neighboring block.

In a possible implementation, the determining module is specifically configured to determine, based on a flag MIP_FLAG, whether the intra prediction mode of the neighboring block is the MIP mode, where the intra prediction mode information of the neighboring block includes the MIP_FLAG.

According to a sixth aspect, an embodiment of this application provides an intra prediction apparatus, where the apparatus includes:

an obtaining module, configured to obtain an intra prediction mode of a luma block, where the luma block is a luma block corresponding to a current chroma block; a determining module, configured to determine whether the intra prediction mode of the luma block is a MIP mode; and a processing module, configured to: use the intra prediction mode of the luma block as an intra prediction mode of the current chroma block if the intra prediction mode of the luma block is not the MIP mode; or use a default mode as an intra prediction mode of the chroma block if the intra prediction mode of the luma block is the MIP mode.

In a possible implementation, the default mode includes a planar mode or a DC mode.

According to a seventh aspect, an embodiment of this application provides a video codec, where the video codec is configured to encode/decode a picture block and includes:

the intra prediction apparatus according to any one of the fourth aspect to the sixth aspect, where the intra prediction apparatus is configured to: determine a prediction mode of a current block based on a constructed MPM list of the current block, and then determine a predicted pixel value of the current block based on the prediction mode; and a reconstruction module, configured to reconstruct the current block based on the predicted pixel value.

According to an eighth aspect, an embodiment of this application provides a video coding device. The video coding device includes a non-volatile memory and a processor that are coupled to each other. The processor invokes program code stored in the memory to perform the method according to any one of the first aspect to the third aspect.

Compared with that in an existing intra prediction method in which conversion needs to be performed between MIP and intra prediction mode based on a correspondence between the MIP and the another other intra prediction mode to construct an MPM list, in the embodiments of this application, the intra prediction mode of the neighboring block may not be used for the MPM list construction of the current block when some conditions are satisfied, so that conversion based on the correspondence between the MIP and the other intra prediction mode can be avoided, and complexity of the MPM list construction can be reduced.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

Figure 1A:
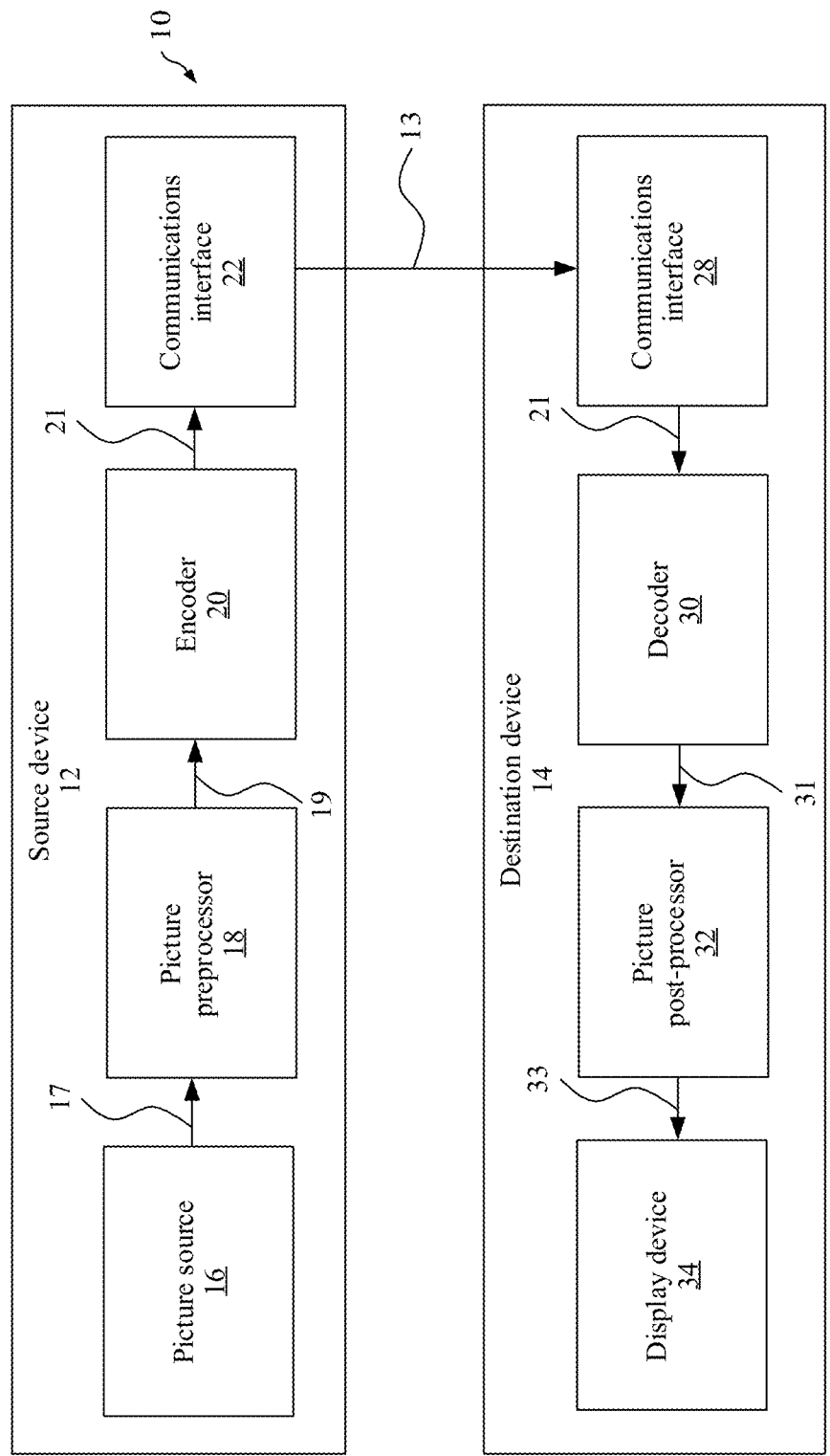
FIG. 1A is a block diagram of an example of a video encoding and decoding system according to an embodiment of this application.

The following describes the embodiments of this application with reference to the accompanying drawings in the embodiments of this application. In the following description, reference is made to the accompanying drawings that form a part of this disclosure and show, by way of illustration, specific aspects of the embodiments of this application or specific aspects in which the embodiments of this application may be used. It should be understood that the embodiments of this application may be used in other aspects, and may include structural or logical changes not depicted in the accompanying drawings. Therefore, the following detailed description shall not be taken in a limiting sense, and the scope of this application is defined by the appended claims. For example, it should be understood that disclosed content in combination with a described method may also hold true for a corresponding device or system configured to perform the method and vice versa. For example, if one or more specific method steps are described, a corresponding device may include one or more units such as functional units to perform the described one or more method steps (for example, one unit performing the one or more steps, or a plurality of units each performing one or more of the plurality of steps), even if such one or more units are not explicitly described or illustrated in the accompanying drawings. In addition, for example, if a specific apparatus is described based on one or more units such as functional units, a corresponding method may include a step used to perform functionality of the one or more units (for example, one step used to perform the functionality of the one or more units, or a plurality of steps each used to perform functionality of one or more of a plurality of units), even if such one or more steps are not explicitly described or illustrated in the accompanying drawings. Further, it should be understood that features of various example embodiments and/or aspects described in this specification may be combined with each other, unless otherwise specified.

The technical solutions in the embodiments of this application may not only be applied to existing video coding standards (for example, standards such as H.264 and HEVC), but also be applied to future video coding standards (for example, the H.266 standard). Terms used in the embodiments of this application are only used to explain specific embodiments of this application, but are not intended to limit this application. The following first briefly describes some concepts that may be used in the embodiments of this application.

Video coding typically refers to processing of a sequence of pictures, where the sequence of pictures forms a video or a video sequence. In the video coding field, the terms "picture", "frame", and "image" may be used as synonyms. Video coding in this specification refers to video encoding or video decoding. Video encoding is performed on a source side, and usually includes processing (for example, through compression) an original video picture to reduce an amount of data for representing the video picture, for more efficient storage and/or transmission. Video decoding is performed on a destination side, and usually includes inverse processing relative to an encoder to reconstruct the video picture. "Coding" of a video picture in the embodiments should be understood as "encoding" or "decoding" of a video sequence. A combination of an encoding part and a decoding part is also referred to as coding (encoding and decoding).

A video sequence includes a series of pictures, a picture is further partitioned into slices, and a slice is further partitioned into blocks. Video coding is performed by block. In some new video coding standards, the concept "block" is further extended. For example, a macroblock (MB) is introduced in the H.264 standard. The macroblock may further be partitioned into a plurality of prediction blocks that can be used for predictive coding (partition). In the high efficiency video coding (HEVC) standard, basic concepts such as "coding unit" (CU), "prediction unit" (PU), and "transform unit" (TU) are used. A plurality of types of block units are obtained through function division, and are described by using a new tree-based structure. For example, a CU may be partitioned into smaller CUs based on a quadtree, and the smaller CU may further be partitioned, to generate a quadtree structure. The CU is a basic unit for partitioning and encoding a coded picture. A PU and a TU also have similar tree structures. The PU may correspond to a prediction block, and is a basic unit for predictive coding. The CU is further partitioned into a plurality of PUs in a partitioning mode. The TU may correspond to a transform block, and is a basic unit for transforming a prediction residual. However, in essence, all of the CU, the PU, and the TU are conceptually blocks (or referred to as picture blocks).

For example, in HEVC, a CTU is partitioned into a plurality of CUs by using a quadtree structure represented as a coding tree. A decision on whether to encode a picture region through inter (temporal) or intra (spatial) prediction is made at a CU level. Each CU may further be partitioned into one, two, or four PUs based on a PU partitioning pattern. In one PU, a same prediction process is applied, and related information is transmitted to a decoder on a PU basis. After a residual block is obtained by applying the prediction process based on the PU partitioning pattern, the CU may be partitioned into transform units (TUs) based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

In this specification, for ease of description and understanding, a to-be-coded picture block in a current coded picture may be referred to as a current block. For example, in encoding, the current block is a block that is being encoded, and in decoding, the current block is a block that is being decoded. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after a plurality of reference blocks are traversed, an optimal reference block is found. The optimal reference block provides prediction for the current block, and this block is referred to as a prediction block.

In a case of lossless video coding, an original video picture may be reconstructed. To be specific, a reconstructed video picture has same quality as the original video picture (assuming that no transmission loss or other data loss occurs during storage or transmission). In a case of lossy video coding, further compression is performed through, for example, quantization, to reduce an amount of data for representing a video picture, but the video picture cannot be completely reconstructed on a decoder side. To be specific, quality of a reconstructed video picture is lower or poorer than that of the original video picture.

Several H.261 video coding standards are for "lossy hybrid video coding" (to be specific, spatial and temporal prediction in a sample domain is combined with 2D transform coding for applying quantization in a transform domain). Each picture of a video sequence is usually partitioned into a set of non-overlapping blocks, and coding is usually performed at a block level. To be specific, on an encoder side, a video is usually processed, that is, encoded, at a block (video block) level. For example, a prediction block is generated through spatial (intra) prediction and temporal (inter) prediction, the prediction block is subtracted from a current block (a block being processed or to be processed) to obtain a residual block, and the residual block is transformed in a transform domain and quantized to reduce an amount of data that is to be transmitted (compressed). On a decoder side, an inverse processing part relative to an encoder is applied to an encoded block or a compressed block to reconstruct the current block for representation. Furthermore, the encoder duplicates a processing loop of a decoder, so that the encoder and the decoder generate same prediction (for example, intra prediction and inter prediction) and/or reconstruction, to process, that is, to code, subsequent blocks.

The following describes a system architecture to which the embodiments of this application are applied. FIG. 1A is a schematic block diagram of an example of a video encoding and decoding system 10 to which the embodiments of this application are applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, an in-vehicle computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation form, the encoder 20, the picture source 16, the picture preprocessor 18, and the communications interface 22 may be hardware components in the source device 12, or may be software programs in the source device 12. Descriptions are separately provided as follows:

The picture source 16 may include or be any type of picture capturing device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements. The picture element in the array may also be referred to as a sample. Quantities of samples in horizontal and vertical directions (or axes) of the array or the picture define a size and/or resolution of the picture. For color representation, three color components are usually used. To be specific, the picture may be represented as or include three sample arrays. For example, in an RGB format or color space, the picture includes corresponding red, green, and blue sample arrays. However, in video coding, each pixel is usually represented in a luma/chroma format or color space. For example, a picture in a YUV format includes a luma component indicated by Y (sometimes indicated by L alternatively) and two chroma components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include only a luma sample array. In this embodiment of this application, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of a chroma block prediction method described in this application.

The communications interface 22 may be configured to receive the encoded picture data 21, and transmit the encoded picture data 21 to the destination device 14 or any other device (for example, a memory) through the link 13 for storage or direct reconstruction. The other device may be any device used for decoding or storage. The communications interface 22 may be, for example, configured to encapsulate the encoded picture data 21 into an appropriate format, for example, a data packet, for transmission over the link 13.

The destination device 14 includes a decoder 30. Optionally, the destination device 14 may further include a communications interface 28, a picture post-processor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (or referred to as a video decoder 30) is configured to receive the encoded picture data 21 and provide decoded picture data 31 or a decoded picture 331 (structural details of the decoder 30 are further described below based on FIG. 3, FIG. 4, or FIG. 5). In some embodiments, the decoder 30 may be configured to perform various embodiments described below, to implement decoder-side application of a chroma block prediction method described in this application.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture to, for example, a user or a viewer. The display device 34 may be or may include any type of display for presenting a reconstructed picture, for example, an integrated or external display or monitor. For example, the display may include a liquid crystal display (LCD), an organic light-emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof Based on the descriptions, a person skilled in the art can definitely learn that existence and (exact) division of functionalities of different units or functionalities of the source device 12 and/or the destination device 14 shown in FIG. 1A may vary depending on an actual device and application. The source device 12 and the destination device 14 may include any of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any of various suitable circuits, for example, one or more microprocessors, a digital signal processor (DSP), an application-specific integrated circuit (ASIC), a field-programmable gate array (FPGA), discrete logic, hardware, or any combination thereof. If the technologies are implemented partially by using software, a device may store a software instruction in a suitable non-transitory computer-readable storage medium and may execute the instruction by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example and the techniques of this application may be applied to video coding settings (for example, video encoding or video decoding) that do not necessarily include any data communication between an encoding device and a decoding device. In another example, data may be retrieved from a local memory, streamed over a network, or the like. A video encoding device may encode the data and store the data into a memory, and/or a video decoding device may retrieve the data from the memory and decode the data. In some examples, devices that only encode data and store the data in the memory and/or retrieve the data from the memory and decode the data and that do not communicate with each other perform encoding and decoding.

Figure 1B:
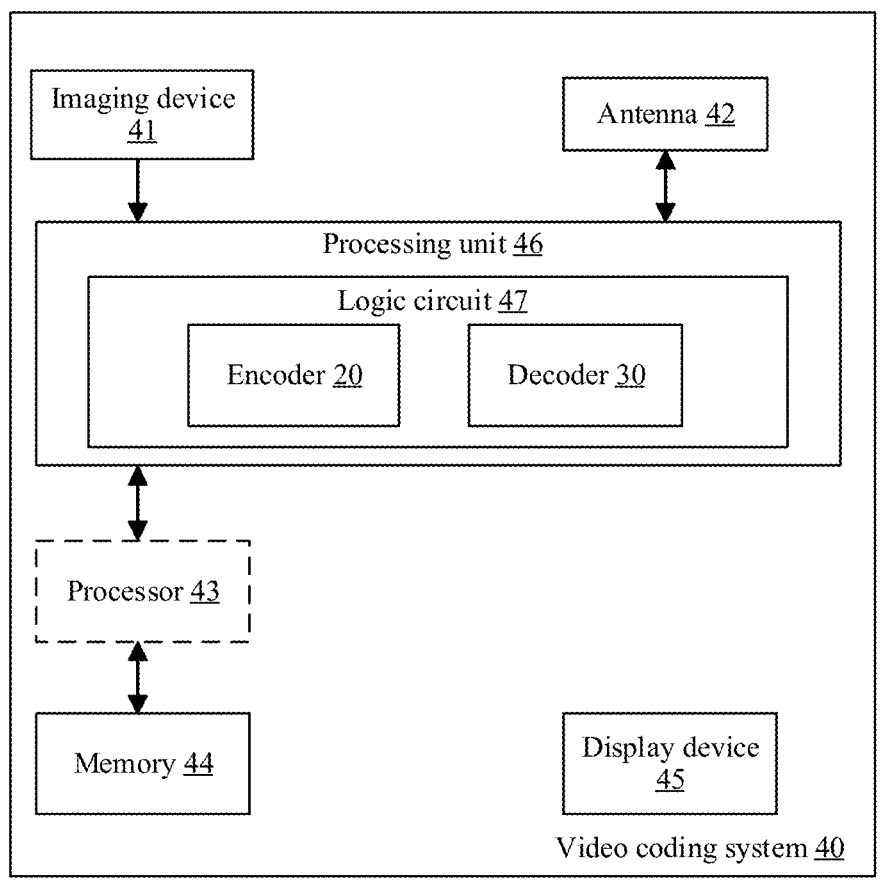
FIG. 1B is a block diagram of an example of a video coding system according to an embodiment of this application.
Figure 2:
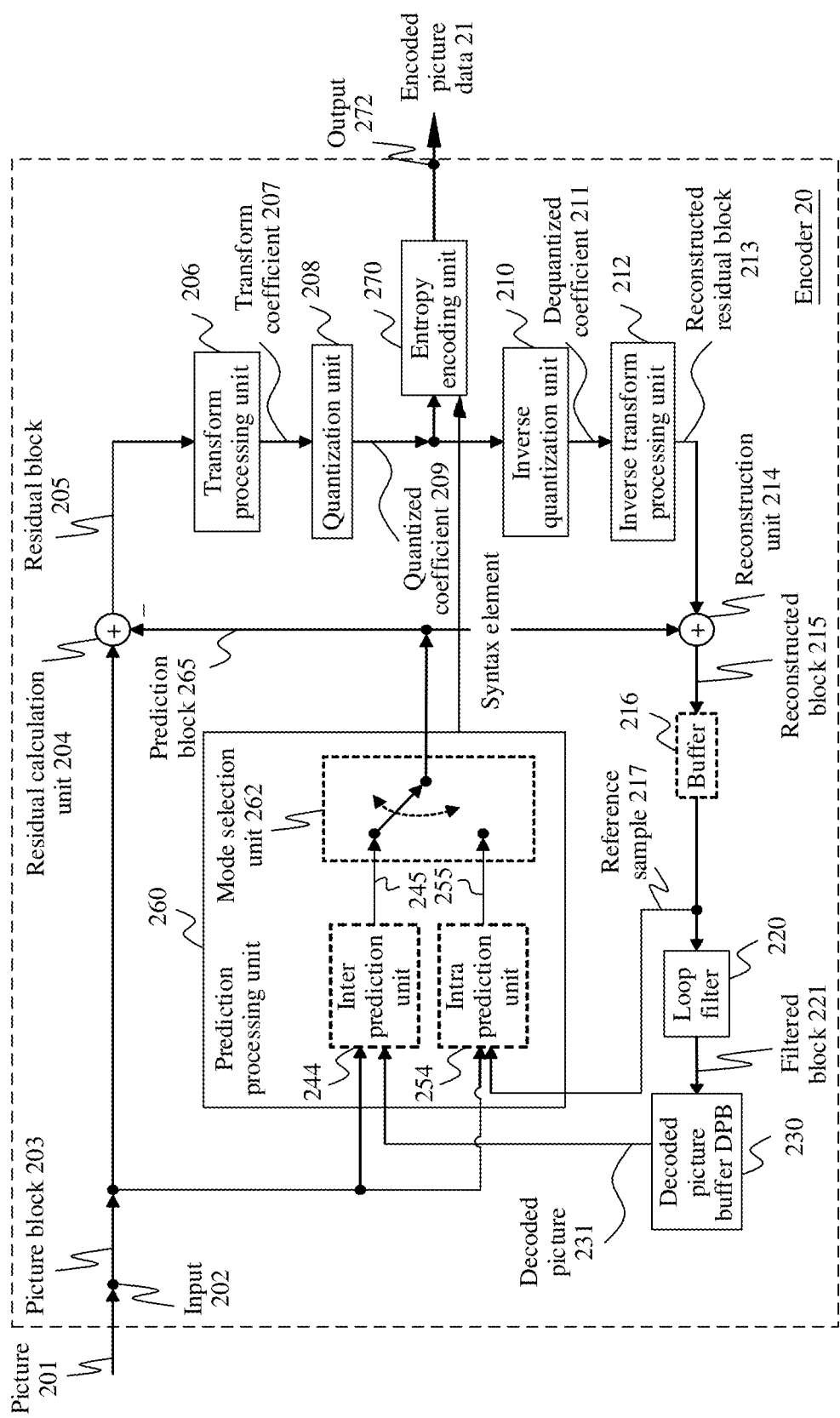
FIG. 2 is a block diagram of an example structure of an encoder according to an embodiment of this application.
Figure 3:
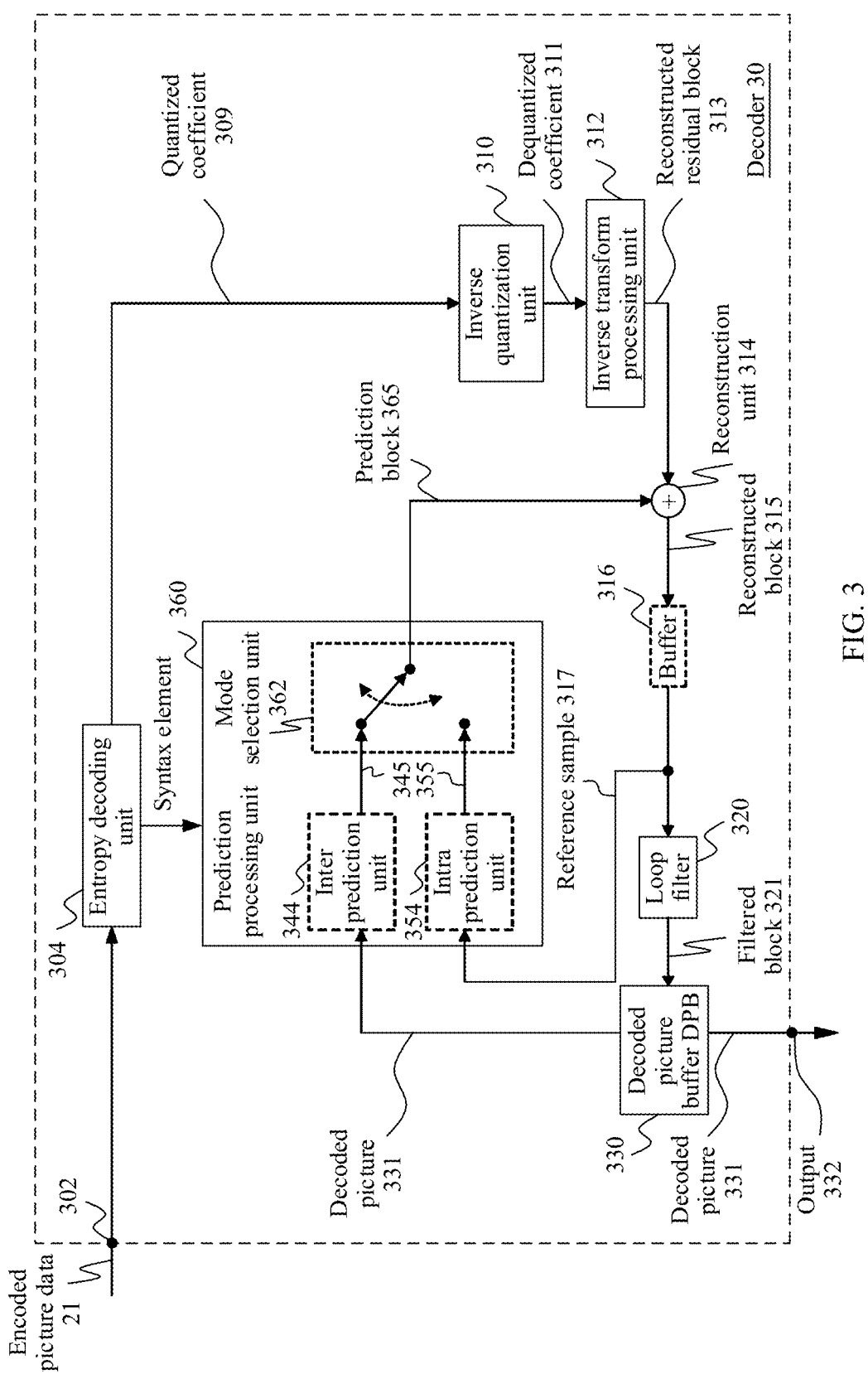
FIG. 3 is a block diagram of an example structure of a decoder according to an embodiment of this application.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments of this application. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include application-specific integrated circuit (ASIC) logic, a graphics processor, a general-purpose processor, or the like. The video coding system 40 may also include the optional processor 43. The optional processor 43 may similarly include application-specific integrated circuit (ASIC) logic, a graphics processor, a general-purpose processor, or the like. In some examples, the logic circuit 47 may be implemented by hardware, for example, dedicated hardware for video coding. The processor 43 may be implemented by general-purpose software, an operating system, or the like. In addition, the memory 44 may be any type of memory, for example, a volatile memory (for example, a static random access memory (SRAM) or a dynamic random access memory (DRAM)), or a non-volatile memory (for example, a flash memory). In a non-restrictive example, the memory 44 may be implemented by cache memory. In some examples, the logic circuit 47 may access the memory 44 (for example, for implementing a picture buffer). In other examples, the logic circuit 47 and/or the processing unit 46 may include a memory (for example, a cache) for implementing a picture buffer.

In some examples, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by the processing unit 46 or the memory 44) and a graphics processing unit (which is implemented by, for example, the processing unit 46). The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame encoding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy-encode the syntax element into an encoded video bitstream. In such examples, the decoder 30 may parse the syntax elements and correspondingly decode the related video data.

It should be noted that, a method for constructing an MPM list and a method for obtaining an intra prediction mode of a chroma block according to the embodiments of this application are mainly used in an intra prediction process. This process exists for both the encoder 20 and the decoder 30. The encoder 20 and the decoder 30 in the embodiments of this application may be an encoder and a decoder corresponding to video standard protocols such as H.263, H.264, HEVC, MPEG-2, MPEG-4, VP8, and VP9 or next-generation video standard protocols (such as H.266).

FIG. 2 is a schematic/conceptual block diagram of an example of an encoder 20 according to an embodiment of this application. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to a decoder 30 in FIG. 3).

The encoder 20 receives, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, for distinguishing the current picture from other pictures, for example, previously encoded and/or decoded pictures in a same video sequence, namely, the video sequence that also includes the current picture).

An embodiment of the encoder 20 may include a partitioning unit (not depicted in FIG. 2), configured to partition the picture 201 into a plurality of blocks such as the picture block 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (further details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints. For example, the scale factor is a power of two for a shift operation, a bit depth of the transform coefficient, and a tradeoff between accuracy and implementation costs. For example, a specific scale factor is specified for the inverse transform by, for example, the inverse transform processing unit 212 on a decoder 30 side (and for a corresponding inverse transform by, for example, the inverse transform processing unit 212 on an encoder 20 side), and correspondingly, a corresponding scale factor may be specified for the forward transform by the transform processing unit 206 on the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step size corresponds to finer quantization, and a larger quantization step size corresponds to coarser quantization. An appropriate quantization step size may be indicated by a quantization parameter (QP). For example, the quantization parameter may be an index to a predefined set of appropriate quantization step sizes. For example, a smaller quantization parameter may correspond to finer quantization (a smaller quantization step size) and a larger quantization parameter may correspond to coarser quantization (a larger quantization step size), and vice versa. The quantization may include division by a quantization step size and corresponding quantization or inverse quantization, for example, performed by the inverse quantization unit 210, or may include multiplication by a quantization step size. In embodiments according to some standards such as HEVC, a quantization parameter may be used to determine the quantization step size. Generally, the quantization step size may be calculated based on a quantization parameter by using a fixed point approximation of an equation including division. Additional scale factors may be introduced for quantization and dequantization to restore a norm of a residual block, where the norm of the residual block may be modified because of a scale used in the fixed point approximation of the equation for the quantization step size and the quantization parameter. In an example implementation, a scale of the inverse transform may be combined with a scale of the dequantization. Alternatively, a customized quantization table may be used and signaled from an encoder to a decoder, for example, in a bitstream. The quantization is a lossy operation, where a larger quantization step size indicates a higher loss.

The inverse quantization unit 210 is configured to apply the inverse quantization of the quantization unit 208 to a quantized coefficient to obtain a dequantized coefficient 211, for example, apply, based on or by using a same quantization step size as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 (or briefly referred to as a "buffer" 216), for example, a line buffer 216, is configured to buffer or store the reconstructed block 215 and a corresponding sample value, for example, for intra prediction. In other embodiments, the encoder may be configured to use unfiltered reconstructed blocks and/or corresponding sample values stored in the buffer unit 216 for any type of estimation and/or prediction, for example, intra prediction.

For example, in an embodiment, the encoder 20 may be configured so that the buffer unit 216 is configured to store not only the reconstructed block 215 used for the intra prediction unit 254 but also a reconstructed block (not shown in FIG. 2) used for the loop filter unit 220 and/or so that, for example, the buffer unit 216 and the decoded picture buffer 230 form one buffer. In another embodiment, a filtered block 221 and/or a block or sample (not shown in FIG. 2) from the decoded picture buffer 230 are/is used as an input or a basis for the intra prediction unit 254.

The loop filter unit 220 (or briefly referred to as a "loop filter" 220) is configured to filter the reconstructed block 215 to obtain the filtered block 221, to smooth pixel transition or improve video quality. The loop filter unit 220 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 220 is shown as an in-loop filter in FIG. 2, in another configuration, the loop filter unit 220 may be implemented as a post filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that the decoder 30 can receive and apply the same loop filter parameter for decoding.

The decoded picture buffer (DPB) 230 may be a reference picture memory that stores reference picture data for use in video data encoding by the encoder 20. The DPB 230 may include any one of a variety of memory devices such as a dynamic random access memory (DRAM) (including a synchronous DRAM (SDRAM), a magnetoresistive RAM (MRAM), or a resistive RAM (RRAM)), or other types of memory devices. The DPB 230 and the buffer 216 may be provided by a same memory device or separate memory devices. In an example, the decoded picture buffer (DPB) 230 is configured to store the filtered block 221. The decoded picture buffer 230 may further be configured to store other previously filtered blocks, for example, previously reconstructed and filtered blocks 221, of the same current picture or of different pictures, for example, previously reconstructed pictures, and may provide complete previously reconstructed, that is, decoded, pictures (and corresponding reference blocks and samples) and/or a partially reconstructed current picture (and corresponding reference blocks and samples), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate distortion optimization (RDO), that is, select a prediction mode that provides minimum rate distortion optimization or select a prediction mode for which related rate distortion at least satisfies a prediction mode selection criterion.

The following describes in detail prediction processing (for example, performed by the prediction processing unit 260) and mode selection (for example, performed by the mode selection unit 262) performed by an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (that is, for example, at least some decoded pictures stored in the DPB 230, as described above) and other inter prediction parameters, for example, depends on whether the entire reference picture or only a part of the reference picture, for example, a search window region around a region of the current block, is used for searching for an optimal matching reference block, and/or for example, depends on whether pixel interpolation such as half-pixel and/or quarter-pixel interpolation is applied. The set of inter prediction modes may include, for example, an advanced motion vector prediction (AMVP) mode and a merge mode. In specific implementation, the set of inter prediction modes may include an improved control point-based AMVP mode and an improved control point-based merge mode in the embodiments of this application. In an example, the intra prediction unit 254 may be configured to perform any combination of intra prediction technologies described below.

In addition to the foregoing prediction modes, a skip mode and/or a direct mode may also be used in the embodiments of this application.

The prediction processing unit 260 may be further configured to partition the picture block 203 into smaller block partitions or subblocks, for example, by iteratively using quadtree (QT) partitioning, binary tree (BT) partitioning, ternary tree (TT) partitioning, or any combination thereof, and perform, for example, prediction on each of the block partitions or subblocks. Mode selection includes selection of a tree structure of the partitioned picture block 203 and selection of a prediction mode used for each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 231, or in other words, the current picture and the previously decoded pictures 231 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a position (coordinates X and Y) of the reference block and a position of the current block as an inter prediction parameter. The offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolation in sub-pixel precision). Interpolation filtering may generate an additional pixel sample from a known pixel sample, thereby potentially increasing a quantity of candidate prediction blocks that may be used to encode a picture block. Upon receiving a motion vector for a PU of the current picture block, a motion compensation unit 246 may locate a prediction block to which the motion vector points in a reference picture list. The motion compensation unit 246 may further generate syntax elements associated with a block and a video slice, for decoding a picture block of the video slice by the decoder 30.

Specifically, the inter prediction unit 244 may transmit the syntax elements to the entropy encoding unit 270, and the syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide an intra prediction parameter, that is, information indicating the selected intra prediction mode for the block, for the entropy encoding unit 270. In an example, the intra prediction unit 254 may be configured to perform any combination of intra prediction technologies.

Specifically, the intra prediction unit 254 may transmit syntax elements to the entropy encoding unit 270, and the syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder 30 may directly perform decoding in a default prediction mode.

The entropy encoding unit 270 is configured to apply (or avoid applying) an entropy coding algorithm or scheme (for example, a variable-length coding (VLC) scheme, a context-adaptive VLC (CAVLC) scheme, an arithmetic coding scheme, context-adaptive binary arithmetic coding (CABAC), syntax-based context-adaptive binary arithmetic coding (SBAC), probability interval partitioning entropy (PIPE) coding, or another entropy coding methodology or technique) on one or all of the following: the quantized residual coefficient 209, the inter prediction parameter, the intra prediction parameter, and/or the loop filter parameter, to obtain encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may further be configured to entropy-encode another syntax element for a current video slice being encoded.

Another structural variant of the video encoder 20 can be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 combined into a single unit.

Specifically, in the embodiments of this application, the encoder 20 may be configured to implement a method for constructing an MPM list and a method for obtaining an intra prediction mode of a chroma block that are described in the following embodiments.

It should be understood that another structural variant of the video encoder 20 may be used to encode a video stream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional. In addition, in a case of lossless compression encoding, the transform processing unit 206, the quantization unit 208, the inverse quantization unit 210, and the inverse transform processing unit 212 are optional. It should be understood that in different application scenarios, the inter prediction unit 244 and intra prediction unit 254 may be used selectively.

FIG. 3 is a schematic/conceptual block diagram of an example of a decoder 30 configured to implement an embodiment of this application. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with respect to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 210. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra-encoded (I) slice, the intra prediction unit 354 of the prediction processing unit 360 is configured to generate the prediction block 365 for a picture block of the current video slice based on a signaled intra prediction mode and data of a previously decoded block of a current frame or picture. When the video frame is encoded into an inter-encoded (namely, B or P) slice, the inter prediction unit 344 (for example, a motion compensation unit) of the prediction processing unit 360 is configured to generate the prediction block 365 for a video block of the current video slice based on a motion vector and the another syntax element that is received from the entropy decoding unit 304. For inter prediction, the prediction block may be generated from one of reference pictures in one reference picture list. The video decoder 30 may construct reference frame lists: a list 0 and a list 1, by using a default construction technology based on reference pictures stored in the DPB 330.

The prediction processing unit 360 is configured to determine prediction information for the video block of the current video slice by parsing the motion vector and the another syntax element, and use the prediction information to generate the prediction block for the current video block being decoded. In an example of this application, the prediction processing unit 360 determines, by using some received syntax elements, a prediction mode (for example, intra or inter prediction) for encoding the video block in the video slice, an inter prediction slice type (for example, a B slice, a P slice, or a GPB slice), construction information of one or more of the reference picture lists for the slice, a motion vector of each inter encoded video block for the slice, an inter prediction status of each inter encoded video block in the slice, and other information, to decode the video block in the current video slice. In another example of this disclosure, the syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice to determine a quantization degree that should be applied and an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (in a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 320 is shown as an in-loop filter in FIG. 3, in another configuration, the loop filter unit 320 may be implemented as a post filter.

Then, a decoded video block 321 in a given frame or picture is stored in the decoded picture buffer 330 that stores a reference picture used for subsequent motion compensation.

The decoder 30 is configured to, for example, output the decoded picture 331 via an output 332, for presentation to a user or viewing by a user.

Another variant of the video decoder 30 may be used to decode a compressed bitstream. For example, the decoder 30 may generate an output video stream without the loop filter unit 320.

For example, a non-transform based decoder 30 can inverse-quantize a residual signal directly without the inverse transform processing unit 312 for some blocks or frames. In another implementation, the video decoder 30 may have the inverse quantization unit 310 and the inverse transform processing unit 312 combined into a single unit.

Specifically, in the embodiments of this application, the decoder 30 is configured to implement a method for constructing an MPM list and a method for obtaining an intra prediction mode of a chroma block that are described in the following embodiments.

It should be understood that another structural variant of the video decoder 30 can be used to decode the encoded video bitstream. For example, the video decoder 30 may generate an output video stream without processing by the filter 320. Alternatively, for some picture blocks or picture frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It should be understood that in different application scenarios, the inter prediction unit and the intra prediction unit may be used selectively.

Figure 4:
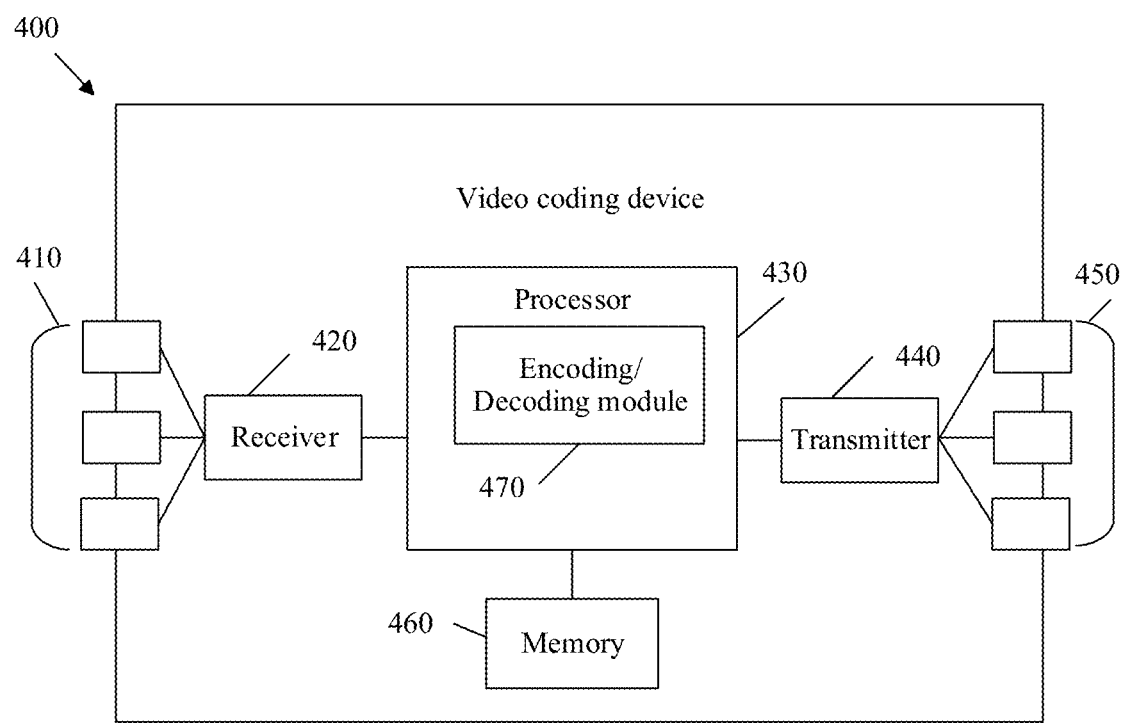
FIG. 4 is a block diagram of an example of a video coding device according to an embodiment of this application.

FIG. 4 is a schematic structural diagram of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A).

In another embodiment, the video coding device 400 may be one or more components of the decoder 30 in FIG. 1A or the encoder 20 in FIG. 1A.

The video coding device 400 includes: an ingress port 410 and a receiving unit (Rx) 420 for receiving data; a processor, a logic unit, or a central processing unit (CPU) 430 for processing data; a transmitter unit (Tx) 440 and an egress port 450 for transmitting data; and a memory 460 for storing data. The video coding device 400 may further include an optical-to-electrical conversion component and an electrical-to-optical (EO) component coupled to the ingress port 410, the receiver unit 420, the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement the chroma block prediction method provided in the embodiments of this application. For example, the encoding/decoding module 470 performs, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or non-volatile, and may be a read-only memory (ROM), a random access memory (RAM), a ternary content-addressable memory (TCAM), and/or a static random access memory (SRAM).

Figure 5:
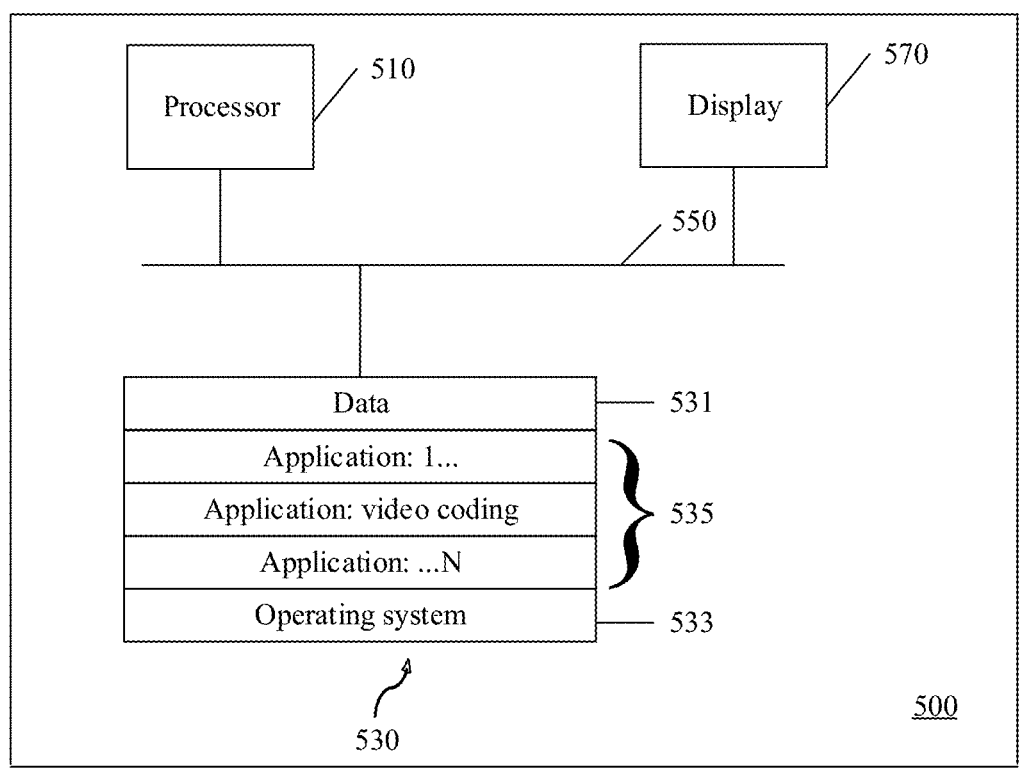
FIG. 5 is a block diagram of another example of an encoding apparatus or a decoding apparatus according to an embodiment of this application.

FIG. 5 is a simplified block diagram of an apparatus 500 that may be used as either or two of the source device 12 and the destination device 14 in FIG. 1A according to an example embodiment. The apparatus 500 can implement the technologies of this application. In other words, FIG. 5 is a schematic block diagram of an implementation of an encoding device or a decoding device (coding device 500 for short) according to an embodiment of this application. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code. The processor may invoke the program code stored in the memory, to perform various video encoding or decoding methods described in this application. To avoid repetition, details are not described herein.

In this embodiment of this application, the processor 510 may be a central processing unit ("CPU" for short), or the processor 510 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, any conventional processor, or the like.

The memory 530 may include a read-only memory (ROM) device or a random access memory (RAM) device. Any other storage device of an appropriate type may alternatively be used as the memory 530. The memory 530 may include code and data 531 accessed by the processor 510 through the bus 550. The memory 530 may further include an operating system 533 and an application program 535. The application program 535 includes at least one program that allows the processor 510 to perform the video encoding or decoding method described in this application (particularly a method for constructing an MPM list and a method for obtaining an intra prediction mode of a chroma block that are described in this application).

In addition to a data bus, the bus system 550 may further include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch display that combines a display and a touch unit that is operable to sense a touch input. The display 570 may be connected to the processor 510 through the bus 550.

The following describes in detail the solutions in the embodiments of this application.

Figure 6:
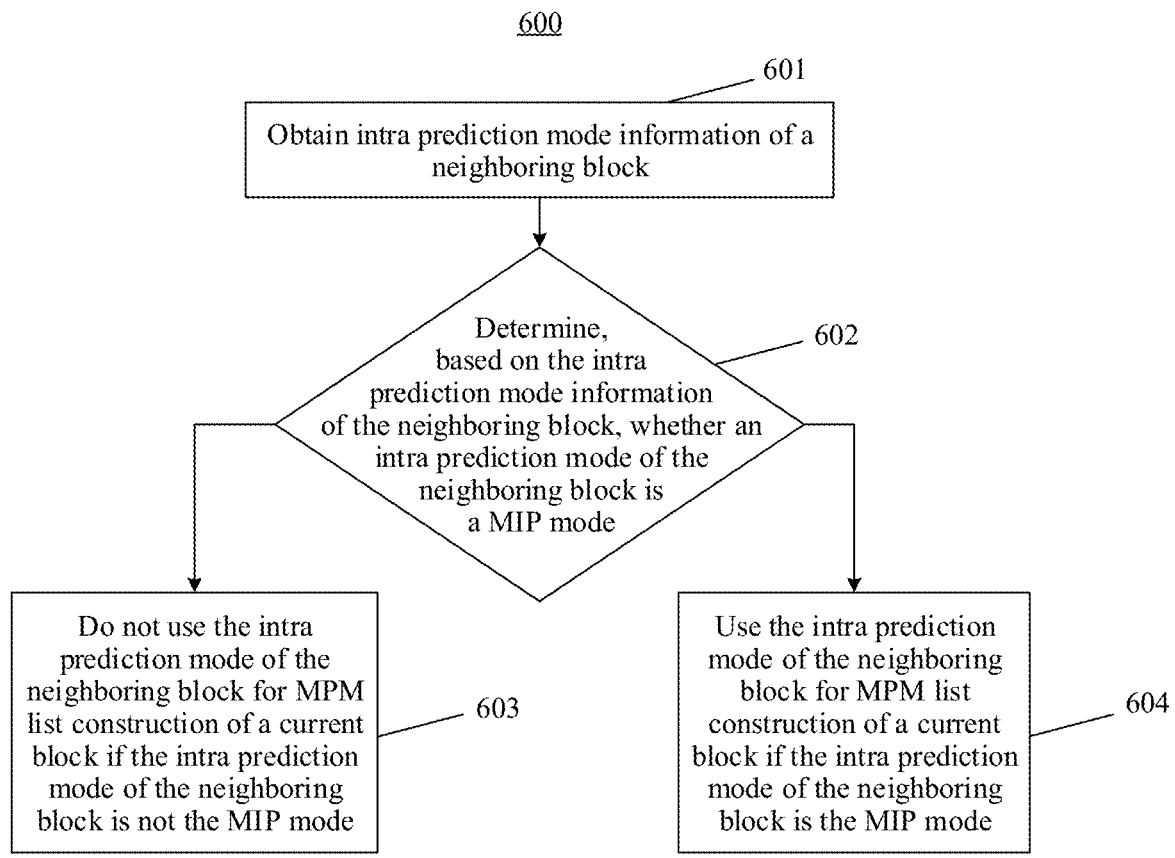
FIG. 6 is a schematic flowchart of a method for constructing an MPM list according to an embodiment of this application.

FIG. 6 is a schematic flowchart of a method for constructing an MPM list according to an embodiment of this application. A process 600 may be performed by the video encoder 20 or the video decoder 30. The process 600 is described as a series of steps or operations. It should be understood that the steps or operations of the process 600 may be performed in various sequences and/or simultaneously, and are not limited to an execution sequence shown in FIG. 6. As shown in FIG. 6, a MIP mode is used for a current block, and the method for constructing an MPM list includes the following steps.

Step 601: Obtain intra prediction mode information of a neighboring block.

Figure 7A:
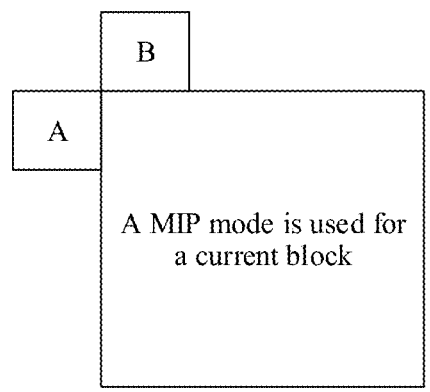
FIG. 7A and FIG. 7B are schematic diagrams of neighboring blocks in a MIP mode.
Figure 7B:
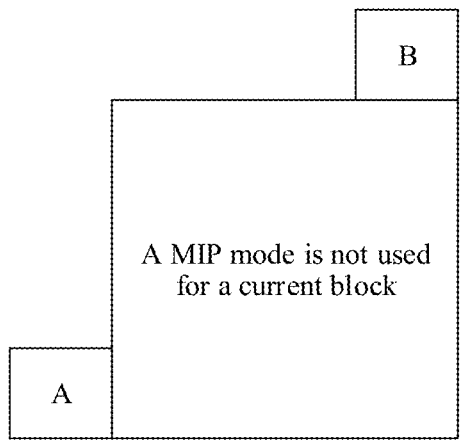

As shown in FIG. 7A and FIG. 7B, because intra prediction is performed mainly by using an above neighboring block and a left neighboring block of the current block in the MIP mode, the neighboring block in this application includes a left neighboring block (A) and/or an above neighboring block (B) of the current block.

Intra prediction performed on the current block is prediction performed based on a predicted value of the neighboring block of the current block, and the neighboring block needs to be a reconstructed picture block. Therefore, whether the neighboring block is available, that is, whether the neighboring block exists and is reconstructed, usually needs to be first determined. For example, if the left neighboring block does not exist, the left neighboring block is unavailable.

Alternatively, if the above neighboring block exists but is not reconstructed, the above neighboring block is unavailable. An available neighboring block is reconstructed, and intra prediction has been performed by using an intra prediction mode during reconstruction of the available neighboring block. Therefore, the intra prediction mode information of the neighboring block can be directly read. The intra prediction mode information of the neighboring block includes a flag (for example, MIP_FLAG or intra_mip_flag) used to indicate whether an intra prediction mode of the neighboring block is the MIP mode, and further includes information used to indicate the specific intra prediction mode of the neighboring block, for example, an intra prediction mode indicated by using IntraPredModeY [xNbX][yNbX]. IntraPredModeY[xNbX][yNbX] is used to indicate an intra prediction mode of a picture block whose coordinates are (xNbX, yNbX), and the coordinates (xNbX, yNbX) indicate a location of a top-left corner of the picture block relative to a top-left corner of a picture in which the picture block is located.

Step 602: Determine, based on the intra prediction mode information of the neighboring block, whether the intra prediction mode of the neighboring block is the MIP mode.

Table 1 shows a correspondence between other intra prediction and a MIP mode, and sizeId is used to indicate a size index of a picture block for which the MIP mode is used. For example, for a picture block whose intra prediction mode IntraPredModeY[xNbX][yNbX] is 0, when sizeId of the picture block is 0, a corresponding MIP mode is 17; when sizeId of the picture block is 1, a corresponding MIP mode is 0; or when sizeId of the picture block is 2, a corresponding MIP mode is 5. For a picture block whose intra prediction mode IntraPredModeY[xNbX][yNbX] is 18, when sizeId of the picture block is 1, a corresponding MIP mode is 7.

TABLE 1

| IntraPredModeY[xNbX][yNbX] | sizeId | | |
|---|---|---|---|
| | 0 | 1 | 2 |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |

TABLE 1-continued

| IntraPredModeY[xNbX][yNbX] | sizeId 0 | 1 | 2 |
|---|---|---|---|
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

Table 2 shows a correspondence between a MIP mode and another intra prediction mode. A MIP mode set includes 35 types of modes in Table 2. There are 35 types of modes corresponding to a 4×4 picture block (whose size index is 0). There are 19 types of modes corresponding to an 8×4, 4×8, or 8×8 picture block (whose size index is 1). There are 11 types of modes corresponding to a picture block (whose size index is 2) of another size. IntraPredModeY[xNbX][yNbX] is used to indicate a specific MIP mode of a picture block whose coordinates are (xNbX, yNbX), the coordinates (xNbX, yNbX) indicate a location of a top-left corner of the picture block relative to a top-left corner of a picture in which the picture block is located, and sizeId is used to indicate a size index of a picture block for which an intra prediction mode (non-MIP mode) is used. For example, for a picture block whose MIP mode IntraPredModeY[xNbX][yNbX] is 0, when sizeId of the picture block is 0, a corresponding intra prediction mode is 0; when sizeId of the picture block is 1, a corresponding intra prediction mode is 0; or when sizeId of the picture block is 2, a corresponding intra prediction mode is 1. For a picture block whose MIP mode IntraPredModeY[xNbX][yNbX] is 18, when sizeId of the picture block is 1, a corresponding intra prediction mode is 0.

TABLE 2

| IntraPredModeY[xNbX][yNbX] | sizeId 0 | 1 | 2 |
|---|---|---|---|
| 0 | 0 | 0 | 1 |
| 1 | 18 | 1 | 1 |
| 2 | 18 | 0 | 1 |
| 3 | 0 | 1 | 1 |
| 4 | 18 | 0 | 18 |
| 5 | 0 | 22 | 0 |
| 6 | 12 | 18 | 1 |
| 7 | 0 | 18 | 0 |
| 8 | 18 | 1 | 1 |
| 9 | 2 | 0 | 50 |
| 10 | 18 | 1 | 0 |
| 11 | 12 | 0 | |
| 12 | 18 | 1 | |
| 13 | 18 | 0 | |
| 14 | 1 | 44 | |
| 15 | 18 | 0 | |
| 16 | 18 | 50 | |
| 17 | 0 | 1 | |
| 18 | 0 | 0 | |
| 19 | 50 | | |
| 20 | 0 | | |
| 21 | 50 | | |
| 22 | 0 | | |
| 23 | 56 | | |
| 24 | 0 | | |
| 25 | 50 | | |
| 26 | 66 | | |
| 27 | 50 | | |
| 28 | 56 | | |
| 29 | 50 | | |
| 30 | 50 | | |
| 31 | 1 | | |
| 32 | 50 | | |
| 33 | 50 | | |
| 34 | 50 | | |

As described above, the intra prediction mode information of the neighboring block includes the flag used to indicate whether the intra prediction mode of the neighboring block is the MIP mode (for example, the flag is MIP_FLAG or intra mip flag, or may be another flag, and this is not specifically limited). Therefore, whether the intra prediction mode of the neighboring block is the MIP mode may be determined based on the MIP_FLAG or intra mip_flag. For example, if a value of the MIP_FLAG is 0, it indicates that the intra prediction mode of the neighboring block is not the MIP mode, or if a value of the MIP_FLAG is 1, it indicates that the intra prediction mode of the neighboring block is the MIP mode. If a value of the intra mip_flag is 1, it indicates that the intra prediction mode of the neighboring block is the MIP mode, or if a value of the intra mip_flag is 0, it indicates that the intra prediction mode of the neighboring block is not the MIP mode.

Step 603: Do not use the intra prediction mode of the neighboring block for MPM list construction of the current block if the intra prediction mode of the neighboring block is not the MIP mode.

In this application, when the intra prediction mode of the neighboring block is not the MIP mode, the intra prediction mode of the neighboring block is set to unavailable, to indicate that the intra prediction mode of the neighboring block is not used for the MPM list construction of the current block. This can avoid a case in which because the MIP mode is not used for both the current block and the neighboring block, conversion needs to be performed between the MIP and another intra prediction mode based on a correspondence between the MIP and the another intra prediction mode to construct an MPM list, so that complexity of the MPM list construction is reduced.

In this case, the MPM list construction is described by using an example in "(2) If the condition in (1) is not satisfied" in the following "2. Construct an MPM list of the current block based on the value of candMipModeX".

Step 604: Use the intra prediction mode of the neighboring block for MPM list construction of the current block if the intra prediction mode of the neighboring block is the MIP mode.

In this application, when the intra prediction mode of the neighboring block is the MIP mode, whether size indices of the current block and the neighboring block are the same needs to be further determined; and the intra prediction mode of the neighboring block is not used for the MPM list construction of the current block if the size indices of the current block and the neighboring block are different; or the intra prediction mode of the neighboring block is used for the MPM list construction of the current block if the size indices of the current block and the neighboring block are the same.

For example, in the foregoing step, the value of cand-MipModeX may be set to −1, to indicate that the intra prediction mode of the neighboring block is not used for the MPM list construction of the current block.

In this application, when the MIP mode is used for the current block, the intra prediction mode of the neighboring block is not used for the MPM list construction of the current block if the intra prediction mode of the neighboring block is not the MIP mode, so that complexity of the MPM list construction can be reduced.

The method embodiment shown in FIG. 6 is described in detail below. For example, a top-left corner of a picture in which the current block is located is used as an origin, coordinates (xCb, yCb) may be used to indicate a location of a top-left corner of the current block relative to the origin, coordinates (xNbA, yNbA) may be used to indicate a location of a top-left corner of the left neighboring block relative to the origin (or the left neighboring block, that is, (xCb −1, yCb), may be obtained based on coordinates of the current block), and coordinates (xNbB, yNbB) may be used to indicate a location of a top-left corner of the above neighboring block relative to the origin (or the above neighboring block, that is, (xCb, yCb −1), may be obtained based on the coordinates of the current block).

1. Determine the value of candMipModeX.

Herein, candMipModeX is used to indicate a candidate value of the intra prediction mode that is of the neighboring block and that is used for the MPM list construction when the MIP mode is used for the current block, and indicates an intra prediction mode. When X is A, it indicates that the neighboring block is the left neighboring block. When X is B, it indicates that the neighboring block is the above neighboring block.

(1) If one or more of the following conditions are satisfied, the value of candMipModeX is set to −1.

a. A neighboring block (X) is unavailable.

In this application, that the neighboring block is unavailable indicates that the neighboring block does not exist or is not reconstructed, or an intra prediction mode of the neighboring block is not the MIP mode. It should be noted that, another condition may alternatively be used to determine whether the neighboring block is available. This is not specifically limited in this application.

b. A prediction mode of the neighboring block (X) is not intra prediction, and is not a combined inter and intra prediction (combined inter and intra prediction, CIIP) mode.

c. pcm_flag[xNbX][yNbX] is 1.

In this application, a flag pcm_flag is used to indicate whether a PCM mode is used for a corresponding neighboring block. For example, if pcm_flag[xNbA][yNbA] is 1, it indicates that the PCM mode is used for the left neighboring block, and if pcm_flag[xNbB][yNbB] is 0, it indicates that the PCM mode is not used for the above neighboring block. Usually, if a neighboring block has no corresponding pcm_flag, it is considered by default that a value of pcm_flag of the neighboring block is 0.

d. When the neighboring block is the above neighboring block, the current block and the above neighboring block are in a same CTU.

(2) If none of the conditions in (1) is satisfied, whether the size indices (sizeId) of the current block and the neighboring block are the same is determined.

In MIP, a correspondence between a size and an index is set based on a size of a picture block. For example, Table 3 is an example of the correspondence between a size of a picture block and a size index.

TABLE 3

| Size of a picture block | sizeId |
| --- | --- |
| The width and the height of the picture block are both 4 | 0 |
| The width and the height of the picture block are less than or equal to 8 | 1 |
| Other | 2 |

A determining process in this step is to determine, through comparison, whether sizeId[xCb][yCb] and sizeId[xNbX][yNbX] are equal. If sizeId[xCb][yCb] and sizeId[xNbX][yNbX] are not equal, the value of candMipModeX is set to −1. If sizeId[xCb][yCb] and sizeId[xNbX][yNbX] are equal, candMipModeX=IntraPredModeY[xNbX][yNbX], where IntraPredModeY[xNbX][yNbX] indicates the intra prediction mode of the neighboring block.

2. Construct an MPM list of the current block based on the value of candMipModeX.

(1) If values of candMipModeA and candMipModeB are both −1, an MPM candidate is obtained according to a method in Table 4.

TABLE 4

| | sizeId | | |
| --- | --- | --- | --- |
| | 0 | 1 | 2 |
| mipMpmCand[0] | 17 | 34 | 5 |
| mipMpmCand[1] | 0 | 7 | 16 |
| mipMpmCand[2] | 1 | 4 | 6 |

0, 1, and 2 in the second row in Table 4 each represent a size index (sizeId) of a picture block. For example, if sizeId of the current block is 0, the MPM list of the current block is a column corresponding to the index 0 in Table 4. In other words, in the MPM list, MPM[0]=17, MPM[1]=0, and MPM[2]=1. Alternatively, if sizeId of the current block is 2, the MPM list of the current block is a column corresponding to the index 2 in Table 4. In other words, in the MPM list, MPM[0]=5, MPM[1]=16, and MPM[2]=6.

For example, if none of intra prediction modes of neighboring blocks can be used for the MPM list construction of the current block, the default modes mipMpmCand[0], mipMpmCand[1], and mipMpmCand[2] are used for the MPM list construction of the current block.

(2) If the condition in (1) is not satisfied, the MPM list is constructed according to the following steps.

a. If the values of candMipModeA and candMipModeB are the same, or a value of at least one of candMipModeA and candMipModeB is −1, whether the value of cand-MipModeA is −1 is determined. If the value of candMipModeA is not −1, MPM[0]=candMipModeA; or if the value of candMipModeA is −1, MPM[0]=candMipModeB. MPM[0] determined in the foregoing step and mipMpmCand[0] in Table 4 are compared. If MPM[0] determined in the foregoing step and mipMpmCand[0] in Table 4 are the same, MPM[1]=mipMpmCand[1] and MPM[2]=mipMpmCand[2]. If MPM[0] determined in the foregoing step and mipMpmCand[0] in Table 4 are different, MPM[1]=mipMpmCand[0] and MPM[2] (MPM[0]!=mipMpmCand[1])?mipMpmCand[1]: mipMpmCand[2].

For example, if an intra prediction mode of at least one neighboring block cannot be used for the MPM list construction of the current block, after a default mode and an available intra prediction mode of a neighboring block are deduplicated, an intra prediction mode obtained after the deduplication is used for the MPM list construction of the current block. The default mode includes one or more of mipMpmCand[0], mipMpmCand[1], and mipMpmCand[2].

b. If the values of candMipModeA and candMipModeB are different, and neither of the values of candMipModeA and candMipModeB is −1, MPM[0]=candMipModeA and MPM[1]=candMipModeB. The three values mipMpmCand[0], mipMpmCand[1], and mipMpmCand[2] in the column corresponding to sizeId of the current block in Table 4 are sequentially deduplicated with the determined MPM[0] and MPM[1], and an available value in the three values is used as MPM[2]. For example, MPM[0]=17, MPM[1]=7, and sizeId of the current block is 0. A column {17, 0, 1} corresponding to 0 is deduplicated. Because 17 is the same as MPM[0], MPM[2]=0. Alternatively, MPM[0]=5, MPM[1]=6, and sizeId of the current block is 2. A column {5, 16, 6} corresponding to 2 is deduplicated. Because 5 is the same as MPM[0], and 6 is the same as MPM[1], MPM[2]=16.

For example, if all intra prediction modes of neighboring blocks can be used for the MPM list construction of the current block, the intra prediction modes of the neighboring blocks are used for the MPM list construction of the current block. Then, after a default mode and an available intra prediction mode of a neighboring block are deduplicated, an intra prediction mode obtained after the deduplication is used for the MPM list construction of the current block. The default mode includes one or more of mipMpmCand[0], mipMpmCand[1], and mipMpmCand[2].

This can avoid a case in which because the MIP mode is not used for both the current block and the neighboring block, conversion needs to be performed between the MIP and another intra prediction mode based on a correspondence between the MIP and the other intra prediction mode to construct the MPM list, so that complexity of the MPM list construction is reduced.

Figure 8:
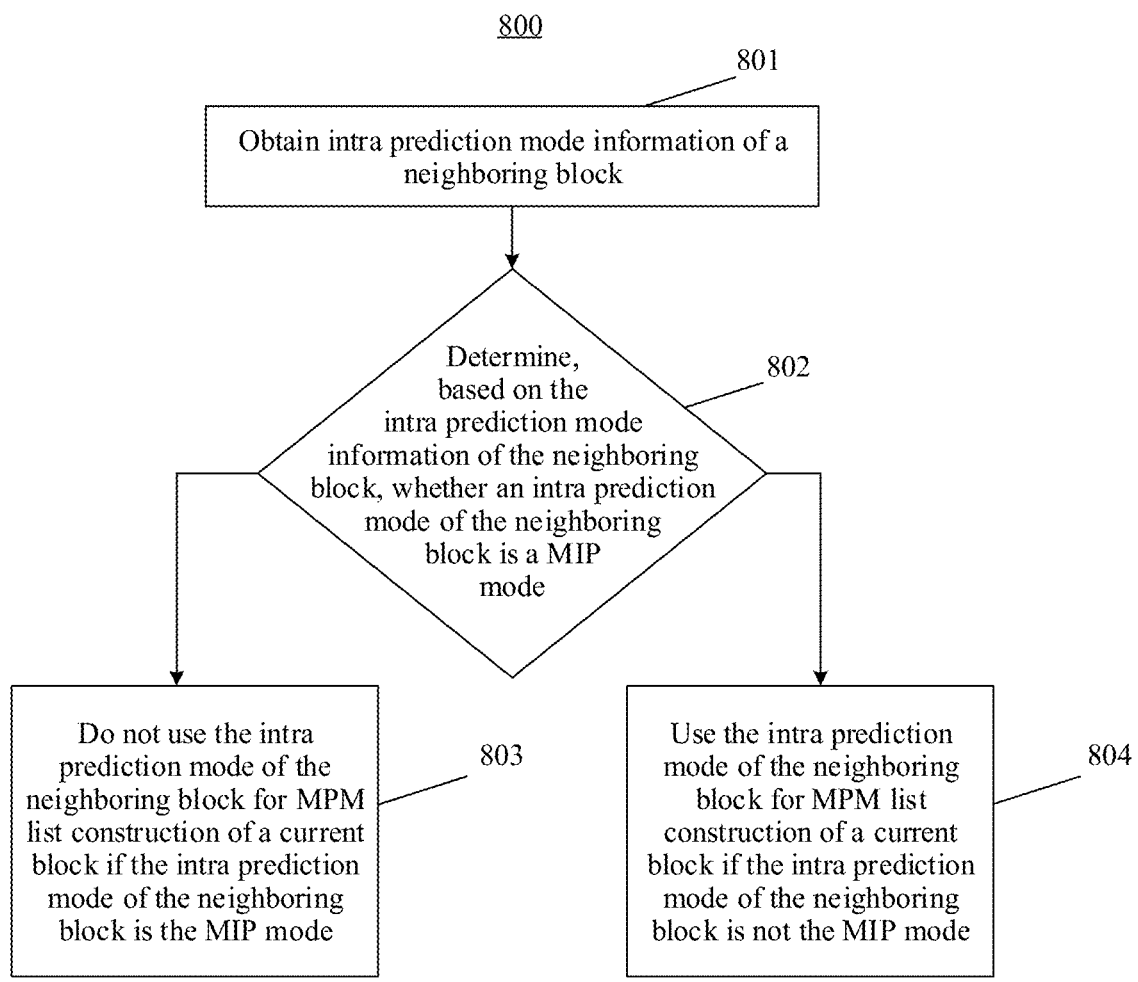
FIG. 8 is another schematic flowchart of a method for constructing an MPM list according to an embodiment of this application.

FIG. 8 is another schematic flowchart of a method for constructing an MPM list according to an embodiment of this application. A process 800 may be performed by the video encoder 20 or the video decoder 30. The process 800 is described as a series of steps or operations. It should be understood that the steps or operations of the process 800 may be performed in various sequences and/or simultaneously, and are not limited to an execution sequence shown in FIG. 8. A difference between this embodiment and the embodiment shown in FIG. 6 lies in that a MIP mode is not used for a current block. As shown in FIG. 8, the method for constructing an MPM list includes the following steps.

Step 801: Obtain intra prediction mode information of a neighboring block.

Step 802: Determine, based on the intra prediction mode information of the neighboring block, whether an intra prediction mode of the neighboring block is the MIP mode.

Principles of steps 801 and 802 in this embodiment are similar to those of steps 601 and 602 in the embodiment shown in FIG. 6, and details are not described herein again.

Step 803: Do not use the intra prediction mode of the neighboring block for MPM list construction of the current block if the intra prediction mode of the neighboring block is the MIP mode.

In this application, likewise, the intra prediction mode of the neighboring block is not used for the MPM list construction of the current block. A constraint in step 803 is that the intra prediction mode of the neighboring block is the MIP mode. However, a constraint in step 603 is that the intra prediction mode of the neighboring block is not the MIP mode. A common principle of the two constraints is that not both the intra prediction mode of the neighboring block and an intra prediction mode of the current block are the MIP mode.

In this application, when the intra prediction mode of the neighboring block is the MIP mode, the intra prediction mode of the neighboring block is set to unavailable, to indicate that the intra prediction mode of the neighboring block is not used for the MPM list construction of the current block. This can avoid a case in which because the MIP mode is not used for both the current block and the neighboring block, conversion needs to be performed between the MIP and another intra prediction mode based on a correspondence between the MIP and the other intra prediction mode to construct an MPM list, so that complexity of the MPM list construction is reduced.

Step 804: Use the intra prediction mode of the neighboring block for MPM list construction of the current block if the intra prediction mode of the neighboring block is not the MIP mode.

In this application, likewise, the intra prediction mode of the neighboring block is used for the MPM list construction of the current block. A constraint in step 804 is that the intra prediction mode of the neighboring block is not the MIP mode. However, a constraint in step 604 is that the intra prediction mode of the neighboring block is the MIP mode. A common principle of the two constraints is that the intra prediction mode of the neighboring block and an intra prediction mode of the current block are the MIP mode.

For example, in the foregoing step, a value of candIntraPredModeX may be set to −1, to indicate that the intra prediction mode of the neighboring block is not used for the MPM list construction of the current block.

In this application, when the MIP mode is not used for the current block, the intra prediction mode of the neighboring block is not used for the MPM list construction of the current block if the intra prediction mode of the neighboring block is the MIP mode, so that complexity of the MPM list construction can be reduced.

The method embodiment shown in FIG. 8 is described in detail below. For example, a top-left corner of a picture in which the current block is located is used as an origin, coordinates (xCb, yCb) may be used to indicate a location of a top-left corner of the current block relative to the origin, coordinates (xNbA, yNbA) may be used to indicate a location of a top-left corner of a left neighboring block relative to the origin, and coordinates (xNbB, yNbB) may be used to indicate a location of a top-left corner of an above neighboring block relative to the origin.

1. Determine the value of candIntraPredModeX.

Herein, candIntraPredModeX is used to indicate a candidate value of the intra prediction mode that is of the neighboring block and that is used for the MPM list construction when the MIP mode is not used for the current block, and indicates an intra prediction mode. When X is A, it indicates that the neighboring block is the left neighboring block. When X is B, it indicates that the neighboring block is the above neighboring block.

(1) If one or more of the following conditions are satisfied, the value of candIntraPredModeX is set to a planar mode (INTRA_PLANAR).

a. A neighboring block (X) is unavailable.

In this application, that the neighboring block is unavailable indicates that the neighboring block does not exist or is not reconstructed, or an intra prediction mode of the neighboring block is the MIP mode. It should be noted that, another condition may alternatively be used to determine whether the neighboring block is available. This is not specifically limited in this application.

b. The prediction mode of the neighboring block (X) is neither intra prediction nor a CIIP mode.

c. pcm_flag[xNbX][yNbX] is 1.

d. When the neighboring block is the above neighboring block, the current block and the above neighboring block are in a same CTU.

(2) If neither of the conditions in (1) is satisfied, candIntraPredModeX=IntraPredModeY[xNbX][yNbX], where IntraPredModeY[xNbX][yNbX] indicates the intra prediction mode of the neighboring block.

2. Construct an MPM list of the current block based on the value of candIntraPredModeX.

The MPM list is constructed based on values of candMipModeA and candMipModeB that are obtained in the foregoing step and a mode size relationship between INTRA_PLANAR and INTRA_DC.

Table 5 shows a correspondence between a mode name and a mode size. The following describes an MPM list construction process by using an example.

TABLE 5

| Mode size | Mode name |
| --- | --- |
| 0 | INTRA PLANAR |
| 1 | INTRA DC |
| 2..66 | INTRA_ANGULAR2..INTRA_ANGULAR66 |
| 81..83 | INTRA_LT_CCLM, INTRA_L_CCLM, INTRA_T_CCLM |

(1) If candIntraPredModeB and candIntraPredModeA are equal, and candIntraPredModeA is greater than INTRA_DC, an MPM list candModeList[x] is as follows, where a value of x ranges from 0 to 4:
candModeList[0]=candIntraPredModeA;
candModeList[1]=2+((candIntraPredModeA+61)%64);
candModeList[2]=2+((candIntraPredModeA−1)%64);
candModeList[3]=INTRA_DC; and
candModeList[4]=2+((candIntraPredModeA+60)%64).

For example, if all intra prediction modes of neighboring blocks can be used for the MPM list construction of the current block, the intra prediction modes of the neighboring blocks are used for the MPM list construction of the current block. Then, the MPM list of the current block is constructed by using a default algorithm based on a default mode and the intra prediction modes of the neighboring blocks. The default mode is INTRA_DC. The default algorithm may be as described above.

(2) If candIntraPredModeB and candIntraPredModeA are not equal, and one of or both candIntraPredModeA and candIntraPredModeB is/are greater than INTRA_DC, the following method is used.
    a. In candIntraPredModeA and candIntraPredModeB, a larger one is taken as maxAB, and a smaller one is taken as minAB.
    b. If both candIntraPredModeB and candIntraPredModeA are greater than INTRA_DC,
candModeList[0]=candIntraPredModeA;
candModeList[1]=candIntraPredModeB;
candModeList[2]=INTRA_DC; and
if maxAB −minAB ranges from 2 to 62,
candModeList[3]=2+((maxAB+61)%64); and
candModeList[4]=2+((maxAB −1)%64); or
if maxAB −minAB does not range from 2 to 62,
candModeList[3]=2+((maxAB+60)%64); and
candModeList[4]=2+((maxAB) %64).

For example, if all intra prediction modes of neighboring blocks can be used for the MPM list construction of the current block, the intra prediction modes of the neighboring blocks are used for the MPM list construction of the current block. Then, the MPM list of the current block is constructed by using a default algorithm based on a default mode, maxAB, and the intra prediction modes of the neighboring blocks. The default mode is INTRA_DC. The default algorithm may be as described above.

c. If one of candIntraPredModeA and candIntraPredModeB is greater than INTRA_DC,
candModeList[0]=maxAB;
candModeList[1]=INTRA_DC;
candModeList[2]=2+((maxAB+61)%64);
candModeList[3]=2+((maxAB −1)%64); and
candModeList[4]=2+((maxAB+60)%64).

For example, if all intra prediction modes of neighboring blocks can be used for the MPM list construction of the current block, the MPM list of the current block is constructed by using a default algorithm based on a default mode, maxAB, and the intra prediction modes of the neighboring blocks. The default mode is INTRA_DC. The default algorithm may be as described above.

(3) If neither (1) nor (2) is satisfied,
candModeList[0]=INTRA_DC;
candModeList[1]=INTRA_ANGULAR50;
candModeList[2]=INTRA_ANGULAR18;
candModeList[3]=INTRA_ANGULAR46; and
candModeList[4]=INTRA_ANGULAR54.

For example, if none of intra prediction modes of neighboring blocks can be used for the MPM list construction of the current block, the MPM list of the current block is constructed based on default modes. The default modes include INTRA_DC, INTRA_ANGULAR50, INTRA_ANGULAR18, INTRA ANGULAR46, and INTRA_ANGULAR54.

This can avoid a case in which because the MIP mode is not used for both the current block and the neighboring block, conversion needs to be performed between the MIP and another intra prediction mode based on a correspondence between the MIP and the other intra prediction mode to construct the MPM list, so that complexity of the MPM list construction is reduced.

Figure 9:
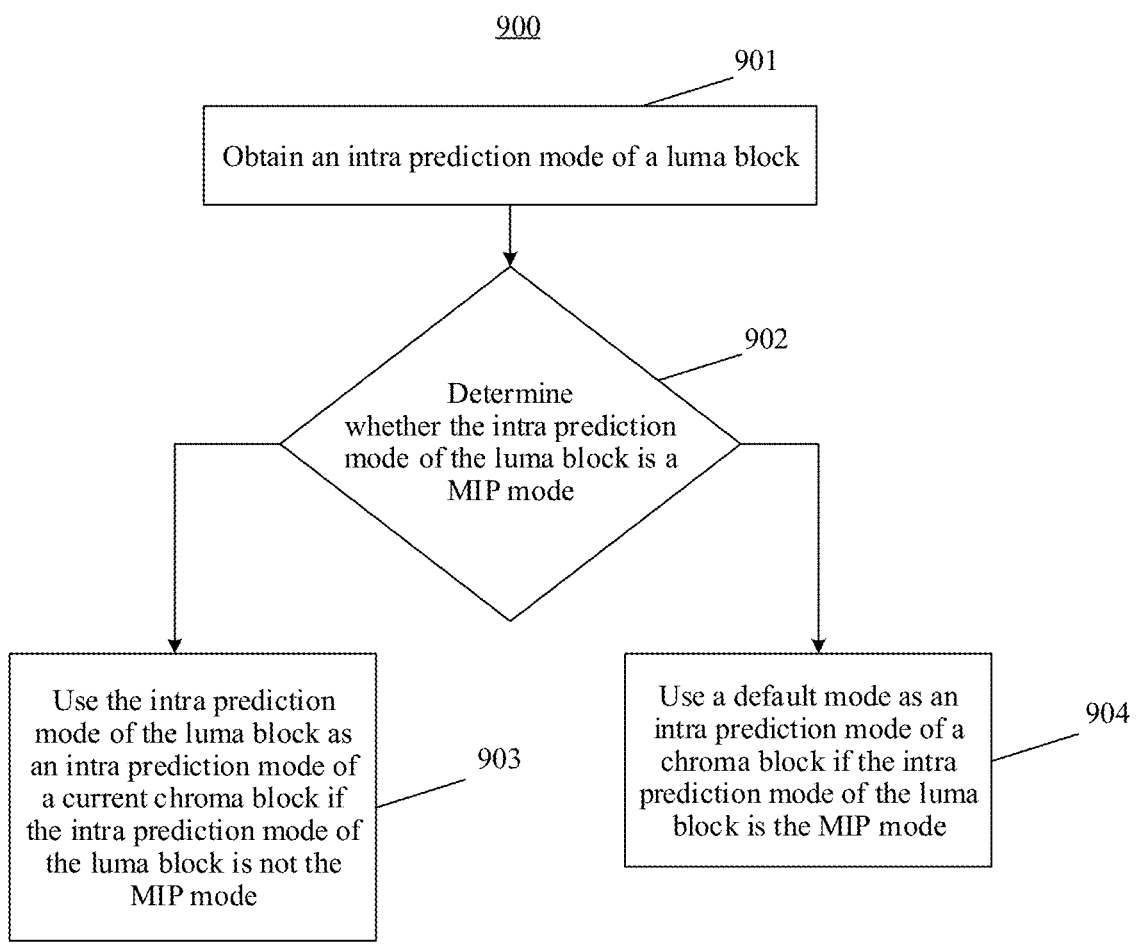
FIG. 9 is a schematic flowchart of a method for obtaining an intra prediction mode of a chroma block according to an embodiment of this application.

FIG. 9 is a schematic flowchart of a method for obtaining an intra prediction mode of a chroma block according to an embodiment of this application. A process 900 may be performed by the video encoder 20 or the video decoder 30. The process 900 is described as a series of steps or operations. It should be understood that the steps or operations of the process 900 may be performed in various sequences and/or simultaneously, and are not limited to an execution sequence shown in FIG. 9. As shown in FIG. 9, the method for obtaining an intra prediction mode of a chroma block includes the following steps.

Step 901: Obtain an intra prediction mode of a luma block.

The luma block is a luma block corresponding to a current chroma block. To be specific, the luma block and the current chroma block are a luma component and a chroma component of a same picture block. Similar to that of the luma block, intra prediction of the chroma block is also to use a boundary pixel of a neighboring reconstructed block around the current chroma block as a reference pixel of the current block, and map the reference pixel to a pixel in the current chroma block based on a specific prediction mode, to serve as a predicted value of the pixel in the current chroma block. A difference lies in that, because a texture of the chroma block is usually relatively simple, a quantity of intra prediction modes of the chroma block is usually less than a quantity of intra prediction modes of the luma block. For example, in H.265, there are only five intra prediction modes of the chroma block, that is, a planar mode, a vertical mode, a horizontal mode, a DC mode, and a DM mode. For example, there are five intra prediction modes of the chroma block in HEVC, which are respectively corresponding to mode indices 0 to 4. The mode index 0 is the planar mode (corresponding to a mode 0 of the luma block). The mode index 1 is the vertical mode (corresponding to a mode 26 of the luma block). The mode index 2 is the horizontal mode (corresponding to a mode 10 of the luma block). The mode index 3 is the DC mode (corresponding to a mode 1 of the luma block). The mode index 4 is the DM mode.

Step 902: Determine whether the intra prediction mode of the luma block is a MIP mode.

As described above, intra prediction mode information of the luma block includes a flag (MIP_FLAG) used to indicate whether the intra prediction mode of the luma block is the MIP mode. Therefore, whether the intra prediction mode of the luma block is the MIP mode may be determined based on the MIP_FLAG. For example, if a value of the MIP_FLAG is 0, it indicates that the intra prediction mode of the luma block is not the MIP mode, or if a value of the MIP_FLAG is 1, it indicates that the intra prediction mode of the luma block is the MIP mode.

The intra prediction mode information of the luma block further includes information used to indicate the specific intra prediction mode of the luma block, for example, an intra prediction mode indicated by using IntraPredModeY [xCb][yCb]. For example, a top-left corner of a picture in which the current block is located is used as an origin, and coordinates (xCb, yCb) may be used to indicate a location of a top-left corner of the current block relative to the origin.

Step 903: Use the intra prediction mode of the luma block as an intra prediction mode of the current chroma block if the intra prediction mode of the luma block is not the MIP mode.

Step 904: Use a default mode as an intra prediction mode of the chroma block if the intra prediction mode of the luma block is the MIP mode.

The default mode of the chroma block includes a planar mode or a DC mode.

For the current chroma block, an intra prediction mode of a luma block covering a center location of the current chroma block is directly inherited. To be specific, an intra prediction mode that is the same as that for a luma component is selected for a chroma component. This is an intra prediction mode obtaining method used when a DM mode is used for a chroma block. In this application, based on the DM mode, in a case in which the MIP mode is added for the luma block, the intra prediction mode of the luma block is used as the intra prediction mode of the current chroma block if the intra prediction mode of the luma block is not the MIP mode, or the default mode is used as the intra prediction mode of the current chroma block if the intra prediction mode of the luma block is the MIP mode, so that complexity of obtaining the intra prediction mode of the chroma block can be reduced.

The method embodiment shown in FIG. 9 is described in detail below. The DM is used for the current chroma block. For example, a top-left corner of a picture in which the current block is located is used as an origin, coordinates (xCb, yCb) may be used to indicate a location of a top-left corner of the current block relative to the origin, coordinates (xNbA, yNbA) may be used to indicate a location of a top-left corner of a left neighboring block relative to the origin, and coordinates (xNbB, yNbB) may be used to indicate a location of a top-left corner of an above neighboring block relative to the origin.

The intra prediction mode lumaIntraPredMode[xCb] [yCb] of the luma block is obtained.

a. If the intra prediction mode of the luma block is the MIP mode, the prediction mode of the current chroma block is directly set to a default value (default mode, where this value is considered as an agreed value between an encoder side and a decoder side), for example, the planar mode or the DC mode. In this case, the following step is not required.

b. If the intra prediction mode of the luma block is not the MIP mode, the prediction mode of the current chroma block is directly set to the intra prediction mode lumaIntraPredMode[xCb][yCb] of the luma block. The intra prediction mode lumaIntraPredMode[xCb][yCb] of the luma block is equal to IntraPredModeY[xCb+cbWidth/2][yCb+cbHeight/ 2], where cbWidth indicates the width of the luma block, and cbHeight indicates the height of the luma block. To be specific, in this case, an intra prediction mode used for a picture block whose top-left corner is a center pixel of the current block is used as the intra prediction mode of the luma block. Then, the intra prediction mode of the current chroma block is directly set to the intra prediction mode of the corresponding luma block.

Figure 10:
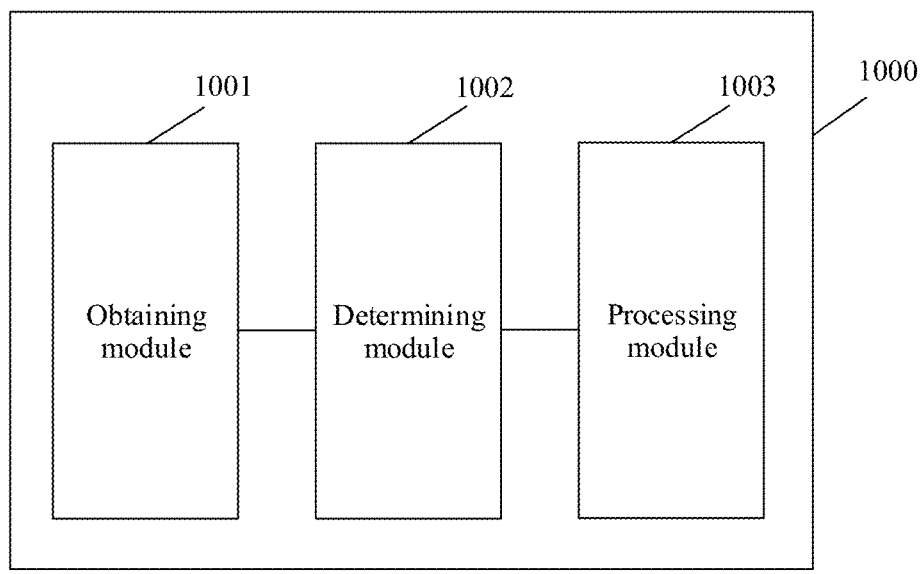
FIG. 10 is a schematic block diagram of an intra prediction apparatus 1000 according to an embodiment of this application.

FIG. 10 is a schematic block diagram of an intra prediction apparatus 1000 according to an embodiment of this application. The intra prediction apparatus 1000 may include an obtaining module 1001, a determining module 1002, and a processing module 1003.

When a MIP mode is used for a current block, the obtaining module 1001 is configured to obtain intra prediction mode information of a neighboring block, where the neighboring block includes an above neighboring block and/or a left neighboring block of the current block; the determining module 1002 is configured to determine, based on the intra prediction mode information of the neighboring block, whether an intra prediction mode of the neighboring block is the MIP mode; and the processing module 1003 is configured not to use the intra prediction mode of the neighboring block for MPM list construction of the current block if the intra prediction mode of the neighboring block is not the MIP mode; or to use the intra prediction mode of the neighboring block for MPM list construction of the current block if the intra prediction mode of the neighboring block is the MIP mode.

In a possible implementation, the processing module 1003 is specifically configured to set the intra prediction mode of the neighboring block to unavailable.

In a possible implementation, the processing module 1003 is further configured to set a value of candMipModeX to −1, to indicate that the intra prediction mode of the neighboring block is not used for the MPM list construction of the current block.

In a possible implementation, the processing module 1003 is further configured to use a default mode for the MPM list construction of the current block if the intra prediction mode of the neighboring block is the MIP mode.

In a possible implementation, the processing module 1003 is specifically configured to: if the intra prediction mode of the neighboring block is the MIP mode, determine whether size indices of the current block and the neighboring block are the same; and not use the intra prediction mode of the neighboring block for the MPM list construction of the current block if the size indices of the current block and the neighboring block are different; or use the intra prediction mode of the neighboring block for the MPM list construction of the current block if the size indices of the current block and the neighboring block are the same.

In a possible implementation, the obtaining module 1001 is further configured to obtain the intra prediction mode of the neighboring block based on the intra prediction mode information of the neighboring block.

In a possible implementation, the determining module 1002 is specifically configured to determine, based on a flag MIP_FLAG, whether the intra prediction mode of the neighboring block is the MIP mode, where the intra prediction mode information of the neighboring block includes the MIP_FLAG.

When a MIP mode is not used for a current block, the obtaining module 1001 is configured to obtain intra prediction mode information of a neighboring block, where the neighboring block includes an above neighboring block and/or a left neighboring block of the current block; the determining module 1002 is configured to determine, based on the intra prediction mode information of the neighboring block, whether an intra prediction mode of the neighboring block is the MIP mode; and the processing module 1003 is configured not to use the intra prediction mode of the neighboring block for MPM list construction of the current block if the intra prediction mode of the neighboring block is the MIP mode; or to use the intra prediction mode of the neighboring block for MPM list construction of the current block if the intra prediction mode of the neighboring block is not the MIP mode.

In a possible implementation, the processing module 1003 is specifically configured to set the intra prediction mode of the neighboring block to unavailable.

In a possible implementation, the processing module 1003 is further configured to set a value of candIntraPredModeX to −1, to indicate that the intra prediction mode of the neighboring block is not used for the MPM list construction of the current block.

In a possible implementation, the processing module 1003 is further configured to use a default mode for the MPM list construction of the current block if the intra prediction mode of the neighboring block is the MIP mode.

In a possible implementation, the obtaining module 1001 is further configured to obtain the intra prediction mode of the neighboring block based on the intra prediction mode information of the neighboring block.

In a possible implementation, the determining module 1002 is specifically configured to determine, based on a flag MIP_FLAG, whether the intra prediction mode of the neighboring block is the MIP mode, where the intra prediction mode information of the neighboring block includes the MIP_FLAG.

When a DM is used for a current chroma block, the obtaining module 1001 is configured to obtain an intra prediction mode of a luma block, where the luma block is a luma block corresponding to the current chroma block; the determining module 1002 is configured to determine whether the intra prediction mode of the luma block is a matrix-based intra prediction MIP mode; and the processing module 1003 is configured to: use the intra prediction mode of the luma block as an intra prediction mode of the current chroma block if the intra prediction mode of the luma block is not the MIP mode; or use a default mode as an intra prediction mode of the chroma block if the intra prediction mode of the luma block is the MIP mode.

In a possible implementation, the default mode includes a planar mode or a DC mode.

It should be noted that, the obtaining module 1001, the determining module 1002, and the processing module 1003 in the intra prediction apparatus 1000 may be used in an intra prediction process on an encoder side or a decoder side. After an MPM list of the current block is constructed, a specific prediction mode of the current block may be determined based on the constructed MPM list of the current block, and then a predicted pixel value of the current block is determined based on the specific prediction mode. Specifically, on the encoder side, the modules may be used in the intra prediction unit 254 in the prediction processing unit 260 of the encoder 20. On the decoder side, the modules may be used in the intra prediction unit 354 in the prediction processing unit 360 of the decoder 30.

It should be further noted that for specific implementation processes of the obtaining module 1001, the determining module 1002, and the processing module 1003, refer to the detailed descriptions of any embodiment in FIG. 6 to FIG. 9. For brevity of the specification, details are not described herein.

A person skilled in the art can understand that the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may all be implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize function aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in each embodiment have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for constructing a most probable mode (MPM) list, wherein a matrix-based intra prediction (MIP) mode is used for a current block, and the method comprising:
   obtaining intra prediction mode information of a neighboring block, wherein the neighboring block comprises an above neighboring block or a left neighboring block of the current block;
   determining, based on the intra prediction mode information of the neighboring block, whether an intra prediction mode of the neighboring block is the MIP mode; and either
   performing MPM list construction of the current block without using the intra prediction mode of the neighboring block when the intra prediction mode of the neighboring block is not the MIP mode; or
   performing MPM list construction of the current block by using the intra prediction mode of the neighboring block when the intra prediction mode of the neighboring block is the MIP mode.

2. The method according to claim 1, wherein performing MPM list construction of the current block without using the intra prediction mode of the neighboring block comprises:
   setting the intra prediction mode of the neighboring block to unavailable.

3. The method according to claim 1, further comprising:
   setting a value of candMipModeX to −1, to indicate that the intra prediction mode of the neighboring block is not used for the MPM list construction of the current block, wherein candMipModeX is used to indicate a candidate value of the intra prediction mode of the neighboring block.

4. The method according to claim 1, further comprising:
   using a default mode for the MPM list construction of the current block when the intra prediction mode of the neighboring block is not the MIP mode.

5. The method according to claim 1, wherein using the intra prediction mode of the neighboring block for MPM list construction of the current block when the intra prediction mode of the neighboring block is the MIP mode comprises:
   determining that size indices of the current block and the neighboring block are the same; and
   using the intra prediction mode of the neighboring block for the MPM list construction of the current block.

6. The method according to claim 1, further comprising:
   obtaining the intra prediction mode of the neighboring block based on the intra prediction mode information of the neighboring block.

7. The method according to claim 1, wherein the determining, based on the intra prediction mode information of the neighboring block, whether the intra prediction mode of the neighboring block is the MIP mode comprises:
   determining, based on a flag, whether the intra prediction mode of the neighboring block is the MIP mode, wherein the intra prediction mode information of the neighboring block comprises the flag.

8. A method for constructing a most probable mode (MPM) list, wherein a matrix-based intra prediction (MIP) mode is not used for a current block, and the method comprising:
   obtaining intra prediction mode information of a neighboring block, wherein the neighboring block comprises an above neighboring block or a left neighboring block of the current block;

determining, based on the intra prediction mode information of the neighboring block, whether an intra prediction mode of the neighboring block is the MIP mode; and either performing MPM list construction of the current block without using the intra prediction mode of the neighboring block when the intra prediction mode of the neighboring block is the MIP mode; or performing MPM list construction of the current block by using the intra prediction mode of the neighboring block when the intra prediction mode of the neighboring block is not the MIP mode.

9. The method according to claim 8, wherein performing MPM list construction of the current block without using the intra prediction mode of the neighboring block comprises:
setting the intra prediction mode of the neighboring block to unavailable.

10. The method according to claim 8, further comprising:
setting a value of candIntraPredModeX to −1, to indicate that the intra prediction mode of the neighboring block is not used for the MPM list construction of the current block, wherein candMipModeX is used to indicate a candidate value of the intra prediction mode of the neighboring block.

11. The method according to claim 8, further comprising:
using a default mode for the MPM list construction of the current block when the intra prediction mode of the neighboring block is the MIP mode.

12. The method according to claim 8, further comprising:
obtaining the intra prediction mode of the neighboring block based on the intra prediction mode information of the neighboring block.

13. The method according to claim 8, wherein determining, based on the intra prediction mode information of the neighboring block, whether the intra prediction mode of the neighboring block is the MIP mode comprises:
determining, based on a flag, whether the intra prediction mode of the neighboring block is the MIP mode, wherein the intra prediction mode information of the neighboring block comprises the flag.

14. A video coding device comprising:
a non-volatile memory; and
a processor coupled to the non-volatile memory, wherein when the processor invokes program code stored in the memory, the video coding device performs:
obtaining intra prediction mode information of a neighboring block, wherein the neighboring block comprises an above neighboring block or a left neighboring block of a current block, wherein a matrix-based intra prediction (MIP) mode is not used for the current block;
determining, based on the intra prediction mode information of the neighboring block, whether an intra prediction mode of the neighboring block is the MIP mode; and either
performing MPM list construction of the current block without using the intra prediction mode of the neighboring block when the intra prediction mode of the neighboring block is the MIP mode; or
performing MPM list construction of the current block by using the intra prediction mode of the neighboring block when the intra prediction mode of the neighboring block is not the MIP mode.

\* \* \* \* \*